United States Patent
Johnson

(10) Patent No.: US 9,102,837 B2
(45) Date of Patent: Aug. 11, 2015

(54) APPARATUS AND METHOD FOR REMOVING PAINTED MARKINGS

(75) Inventor: Jesse Duane Johnson, Brevard, NC (US)

(73) Assignee: Jesse Duane Johnson, Brevard, NC (US)

( * ) Notice: Subject to any disclaimer, the term of this patent is extended or adjusted under 35 U.S.C. 154(b) by 77 days.

(21) Appl. No.: 13/284,551

(22) Filed: Oct. 28, 2011

(65) Prior Publication Data

US 2013/0048016 A1 Feb. 28, 2013

Related U.S. Application Data

(63) Continuation-in-part of application No. 13/199,329, filed on Aug. 26, 2011, now Pat. No. 8,419,863.

(51) Int. Cl.
*C11D 17/00* (2006.01)
*C09D 5/00* (2006.01)
*E01C 23/08* (2006.01)
*C09D 9/00* (2006.01)

(52) U.S. Cl.
CPC ........ *C09D 5/008* (2013.01); *C09D 9/00* (2013.01); *E01C 23/08* (2013.01)

(58) Field of Classification Search
USPC .............................. 134/38; 510/212, 403, 445
See application file for complete search history.

(56) References Cited

U.S. PATENT DOCUMENTS

| | | | |
|---|---|---|---|
| 3,646,726 A * | 3/1972 | Hutcheson | 53/455 |
| 4,528,360 A * | 7/1985 | Fujita et al. | 528/297 |
| 4,579,627 A | 4/1986 | Brailsford | |
| 4,812,255 A | 3/1989 | Suwala | |
| 4,900,364 A | 2/1990 | Diedrich | |
| 5,188,675 A | 2/1993 | Dormon-Brailsford | |
| 5,264,655 A * | 11/1993 | Mirick et al. | 588/318 |
| 5,605,579 A | 2/1997 | Distaso | |
| 7,255,116 B2 | 8/2007 | Crocker | |
| 2001/0022323 A1 | 9/2001 | Aslakson | |
| 2002/0115583 A1 * | 8/2002 | Lant et al. | 510/445 |

FOREIGN PATENT DOCUMENTS

WO   WO 02/02699 A1   1/2002

OTHER PUBLICATIONS

J. Crockett, "Paint Strippper for use on Mild Steel and Aluminum", Feb. 25, 1964, Coating and Chemical Laboratory Aberdeen Proving Ground Maryland.*
United States Patent and Trademark Office; Notice of Allowance and Fees Due; Notice of Allowance and Fees Due from U.S. Appl. No. 12/199,329; copyright and mailing date Dec. 5, 2012, pp. 1-9, publisher United States Patent and Trademark Office, Alexandria, Virginia, USA; (9 pages).

(Continued)

*Primary Examiner* — Jason Ko

(57) ABSTRACT

An apparatus for use in removing painted markings is provided that includes a first covering that is dissolvable by water. A second covering is included that is dissolvable by water. A paint removal agent is present and is located between the first covering and the second covering. A method for removing painted markings is also provided.

9 Claims, 16 Drawing Sheets

(56) References Cited

OTHER PUBLICATIONS

International Searching Authority; International Search Report and Written Opinion of the International Searching Authority; International Application No. PCT/US2012/05081; Patent Cooperation Treaty; pp. 1-13; publisher Korean Intellectual Property Office; Published Seo-gu, Daejeon Metropolitan, Republic of Korea; copyright and mailing date Jan. 31, 2012; (13 pages).

Graffiti Solutions, Inc.; Web site print out titled "Elephant Snot® Graffiti Remover" from http://www.graffitisolutions.com/sites/default/files/ELEPHANT%20SNOT_Data%20Sheet.pdf; visited Aug. 26, 2011; 1 page from website; publisher is Graffiti Solutions, Inc.; city is Saint Paul Minnesota, USA; cpyright 2010; copyright Graffiti Solutions, inc.; (1 page).

* cited by examiner

APPARATUS AND METHOD FOR REMOVING PAINTED MARKINGS

CROSS REFERENCE TO RELATED APPLICATIONS

This application is a continuation-in-part and claims the benefit of U.S. application Ser. No. 13/199,329 filed on Aug. 26, 2011 and entitled, "Method for Removing Painted Markings" that is incorporated by reference herein in its entirety for all purposes.

FIELD OF THE INVENTION

The present invention relates generally to an apparatus and method for the removal of painted markings from surfaces. More particularly, the present application involves a method for the removal of painted road surface markings and other painted markings such as those found in parking lots and airport runways, and those undesirably placed as graffiti.

BACKGROUND

Painted markings are commonly applied to driving surfaces in order to mark lanes, stopping positions, crosswalks, railroad crossings, shoulders, and school zones. Asphalt and concrete surfaces in parking lots and driving areas of shopping malls, hotels, and office parks are also commonly provided with painted markings to guide drivers to desired locations and to demarcate parking positions. Airports also include surfaces that have painted markings for identification and outlining of runways and taxiways. It is often the case that painted markings are located outdoors and are exposed to harsh environmental conditions.

Since these markings may be a critical component of roadway surfaces, it is desirable to make them bright in color and strongly adhered to the roadway surfaces so they will be clearly seen and will not degrade and be removed. Highway paints may be acrylic-based and can contain ingredients such as methyl methacrylate which make them much brighter and durable than normal paints. Lane markings that are hard to see may cause drivers to swerve into adjacent lanes or to in fact drive in a lane designated for oncoming traffic. As such, roadway markings are generally made in a robust manner and are long lasting.

Often times it is desired to remove roadway markings when roads undergo construction or traffic patterns are changed. Further, painted markings are removed in other instances such as when parking spaces in a parking lot are changed. Since highway markings are made of paint that is stronger and more firmly adhered to roadway surfaces than paints applied to common household surfaces, the removal of highway markings is challenging. One cannot use paint removal techniques suitable for household paint removal on painted roadway markings as these two paint applications are not similar to one another but are more apples to oranges in comparison.

Highway marking removal may be accomplished by grinding the painted markings off of the roadway surface. This method is successful in removing the painted markings but also results in significant damage to the asphalt or concrete making up the roadway surface. Another method of removal is to use ultra high pressure water blasting or abrasive blasting (for example sand blasting). These techniques may also create damage to the roadway surface, and with grinding are expensive, slow, and may also result in unpleasant scars on the roadway. Also, in the case of water blasting a large amount of water is generated. If the highway paint is lead based, this large amount of water must be disposed of using proper channels and cannot simply be allowed to drain off of the roadway. Disposal of large amounts of toxic water also increases the cost of the removal. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
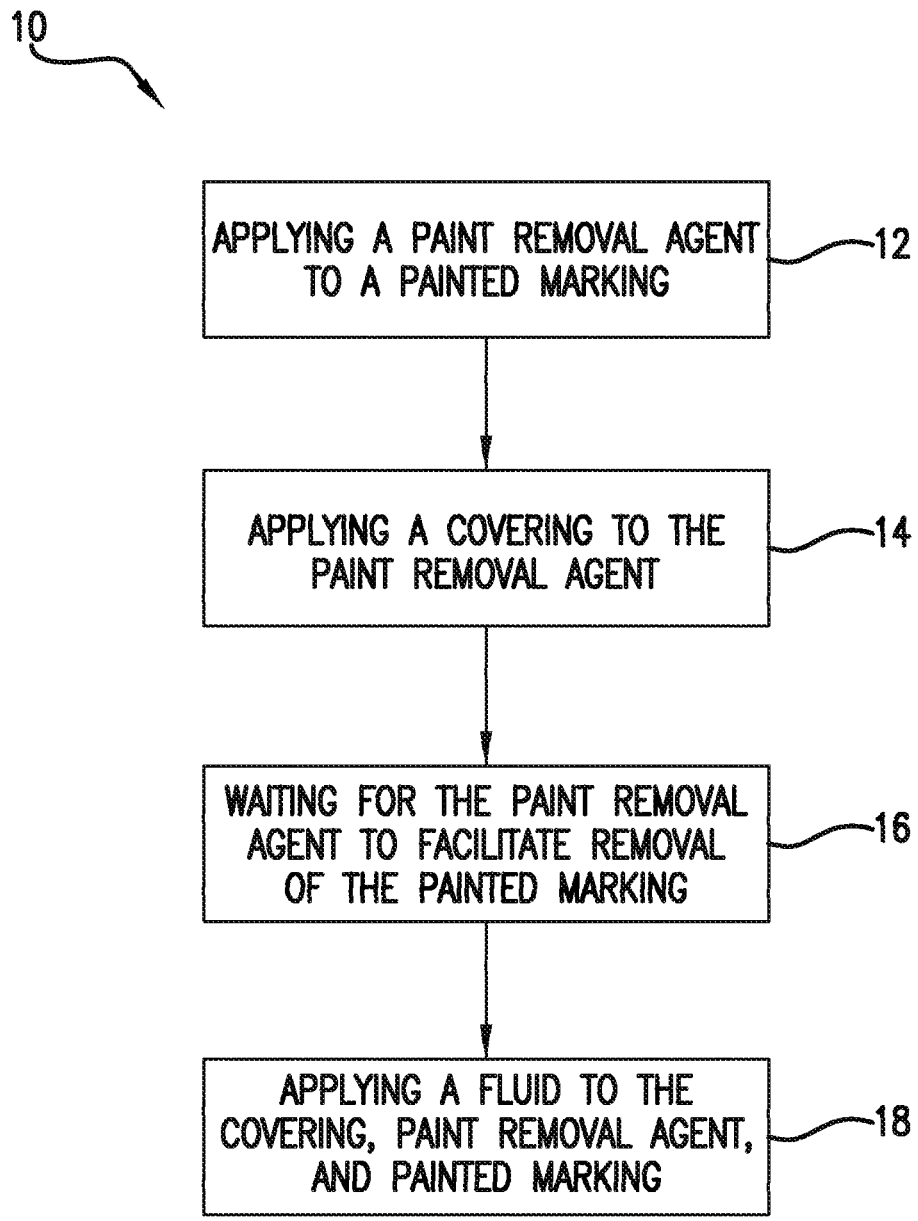
FIG. 1 is a flow chart of a method for removing painted markings in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a method for removing painted markings 10 such as those found in the form of lane dividers 32 on roads 30, or those found in the form of graffiti 50 on buildings, bridges, train cars, or sidewalks. The method 10 includes the application of a paint removal agent 22 to a painted marking 24 on a surface 20. The paint removal agent 22 functions to remove the painted marking 24 from the surface 20. A covering 26 is applied to the paint removal agent 22. The covering 26 may engage the paint removal agent 22 and may cover same in order to prevent evaporation of the paint removal agent 22 such as through evaporation of solvents of the paint removal agent 22, evaporation of certain components of the paint removal agent 22, or evaporation of the entire paint removal agent 22. Fluid 28 may be applied to the paint removal agent 22 while the covering 26 covers the paint removal agent 22. In this regard, the fluid 28 can be applied so as to first engage the covering 26 and then subsequently engage the paint removal agent 22. The covering 26 may be made of a dissolvable material so that the application of fluid 28 causes the covering 26 to break up. The fluid 28 may function to wash the covering 26, paint removal agent 22, and painted marking 24 from the surface 20 so that the painted marking 24 is desirably removed from the surface 20.

Figure 2A:
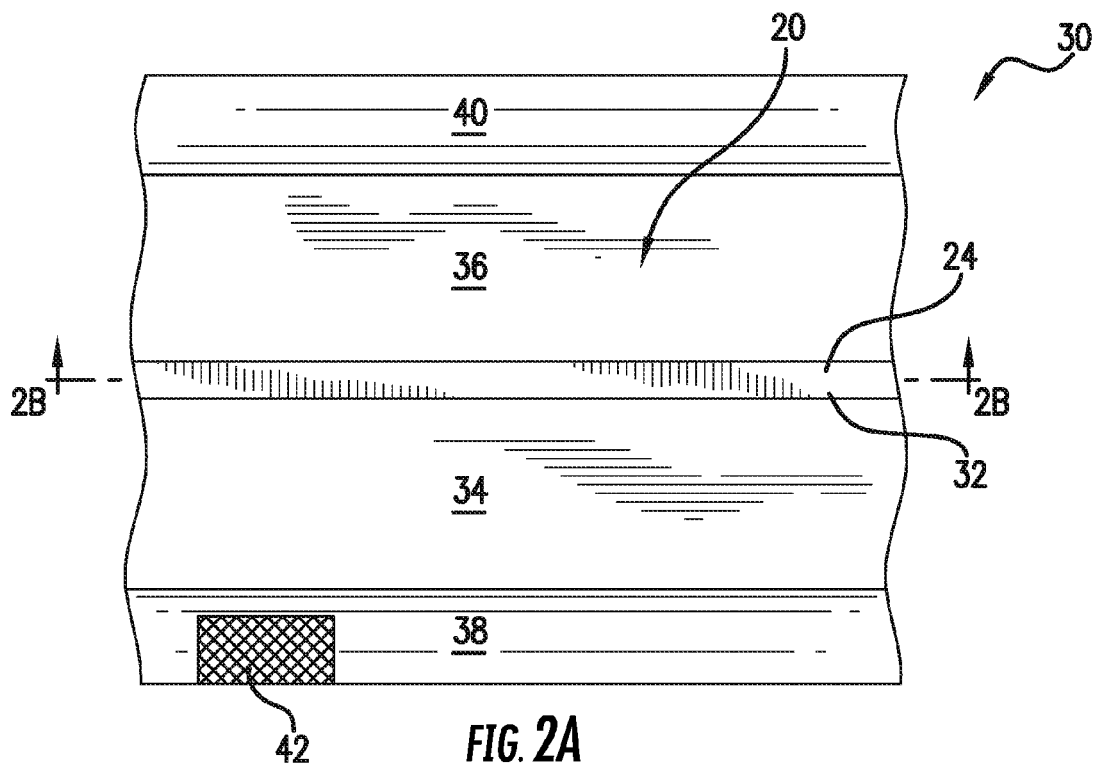
FIG. 2A is a top view of a road that has a painted marking that is a lane divider.
Figure 2B:
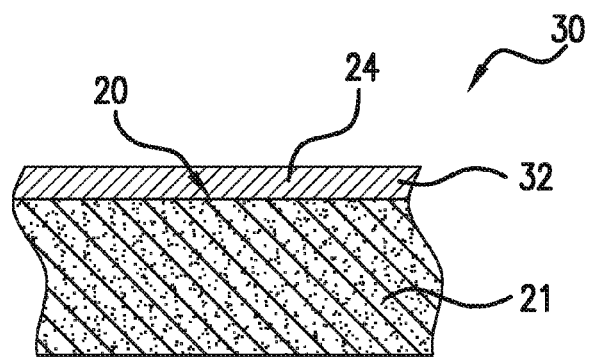
FIG. 2B is a cross-sectional view taken along line 2B-2B of FIG. 2A.

With reference first to FIGS. 2A and 2B, a road 30 is illustrated that is made from a base 21 that can be any type of material known in road design such as asphalt, concrete, or brick. A painted marking 24 is applied to the surface 20 of the base 21. The painted marking 24 may be made of paint that includes ingredients, such as methyl methacrylate, that function to make the painted marking 24 bright and durable. These types of characteristics may be desirable for markings on roads 30 to ensure they are visible in the rain, at night, and over time. However, such enhanced characteristics such as adhesion and durability may make the painted markings 24 harder to remove from the surface 20 when desired. The painted marking 24 can be applied to the surface 20 through a spray gun, paint roller, or any other suitable applicator. The painted marking 24 is adhered to the surface 20 and may form a layer that covers a portion of the surface 20.

The painted marking 24 may be made of SETFAST® acrylic waterborne traffic marking paint in accordance with one exemplary embodiment, provided by The Sherwin-Williams Company having offices located at 101 W. Prospect Avenue, Cleveland, Ohio, 44115, USA. This product may have 56% minimum volume solids, 73% minimum weight solids, 56% minimum pigment weight percentage, may be a 100% acrylic emulsion polymer latex, may be available in white or yellow colors, may be 2% by weight of methanol, may be 55% by weight of calcium carbonate, may be 5% by weight of titanium dioxide, may weight 13.70 pounds per gallon, may have a specific gravity of 1.65, and may not be soluble in water or may be soluble in water.

In accordance with yet another exemplary embodiment, the painted marking 24 may be PROMAR® 400 interior latex flat paint, provided by The Sherwin-Williams Company. This product may be a durable, interior vinyl acrylic paint that can be used on plaster, wallboard, wood, masonry, or metal. This product may have from 26%-30% volume solids, may have from 45%-49% weight solids, may weigh 11.3 pounds per gallon, may be 16% by weight of quartz, may be 3% by weight of cristobalite, may be 4% by weight of kaolin, may be 11% by weight of titanium dioxide, may have a specific gravity of 1.36, and may or may not be soluble in water.

The painted marking 24 may be made of a material that includes lead in some embodiments. In other embodiments, the painted marking 24 is made of a material that does not include lead. Further, titanium dioxide may be in the painted marking 24, or titanium dioxide may be absent from the painted marking 24 in some embodiments.

The painted marking 24 is applied in the form of a lane divider 32 that functions to separate a portion of the road 30 into an east bound lane 34 and a portion into a west bound lane 36. Motorists will use the lane divider 32 as a boundary line in which they will maintain their vehicles on one side thereof when using the road 30. Although shown in the form of a lane divider 32, it is to be understood that the painted marking 24 may be applied in the form of a shoulder boundary, stop line indicator, school zone indicator, railroad crossing warning, or any other indicator used in connection with roads 30. The road 30 also includes a pair of shoulders 38 and 40. Although a painted marking 24 used to designate the boundary between the shoulders 38, 40 and the lanes 34, 36 is not shown in the disclosed road 30, they may be so disclosed in other embodiments. Also, although shown as being a single solid, uninterrupted line, the lane divider 32 may be dashed lines or multiple parallel lines in other embodiments.

One embodiment of the method for removing painted markings 10 is illustrated in flow chart form in FIG. 1. The method 10 may include a step 12 of applying a paint removal agent 22 to the painted marking 24. The paint removal agent 22 may be applied through any suitable application process. For example, the paint removal agent 22 may be sprayed onto the painted marking 24, applied with a rag or towel, applied via a roller or brush, poured onto the painted marking 24 or applied by way of various contacting engagements. In accordance with one exemplary embodiment, a LINELAZER IV professional line stripper may be used to apply the paint removal agent 22. This product may be provided by Pavement Coatings, Inc., having offices located at 2120 N. Grand Avenue, Evansville, Ind., 47711, USA.

Figure 3A:
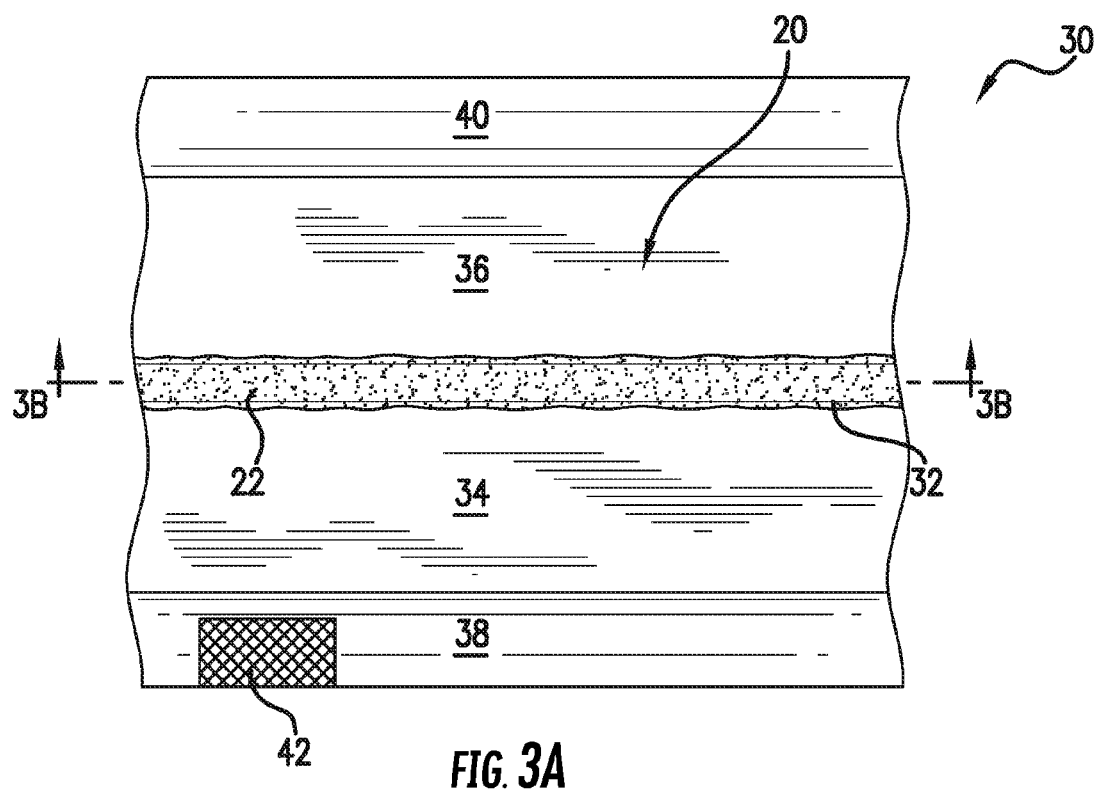
FIG. 3A is a top view of the road of FIG. 2A with a paint removal agent applied to the painted marking.
Figure 3B:
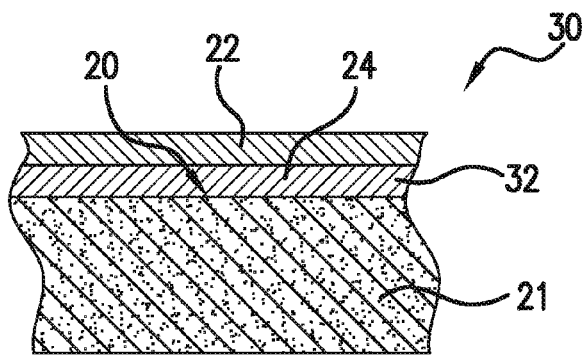
FIG. 3B is a cross-sectional view taken along line 3B-3B of FIG. 3A.

FIGS. 3A and 3B illustrate the paint removal agent 22 applied to the painted marking 24. The paint removal agent 22 may engage the painted marking 24. Further, the paint removal agent 22 may cover the painted marking 24 such that the paint removal agent 22 forms a layer on top of the painted marking 24 to cause the painted marking 24 to be vertically located between the surface 20 and the paint removal agent 22. The paint removal agent 22 may be applied to a portion of the surface 20 that is not covered by the painted marking 24. This may be due to the fact that excess paint removal agent 22 may be applied to the painted marking 24 such that some runs off the edges of the paint removal agent 22 and engages portions of the surface 20 adjacent the painted markings 24 not covered by the painted markings 24.

The paint removal agent 22 may be any material capable of causing the painted marking 24 to be removed from the surface 20. In this regard, the painted marking 24 need not be completely removed from the surface 20. The paint removal agent 22 may function to remove a portion of the painted marking 24 from the surface 20 while leaving some amount of painted marking 24 still on the surface 20. In other arrangements, the paint removal agent 22 may work to completely remove the painted marking 24 from surface 20.

The paint removal agent 22 may be an organic solvent mixture provided under the trade name SMART STRIP by Dumond Chemicals, Inc. having offices located at 104 Interchange Plaza, Suite 202, Monroe Township, N.J. 08331, USA. The SMART STRIP product may be made of, in weight percentages, from 1-5% titanium dioxide, from 1-5% non-hazardous ingredients, from 30-50% of proprietary ingredients, and from 40-60% water. The SMART STRIP product may have partial water solubility, a specific gravity of 1.14, and may be a white viscous liquid in appearance and consistency with a faint, aromatic odor.

In accordance with another exemplary embodiment, the paint removal agent 22 may be an solvent mixture provided under the trade name PEEL AWAY SMART STRIP PRO by Dumond Chemicals, Inc. The PEEL AWAY SMART STRIP PRO product may be made of, in weight percentages, from 1-5% titanium dioxide, from 1-5% non-hazardous ingredients, from 30-50% of proprietary ingredients, from 1-5% formic acid, and from 40-60% water. The PEEL AWAY SMART STRIP PRO product may have partial water solubility, a specific gravity of 1.20, and may be a white paste with a slight characteristic odor. The formic acid may sometimes be known as methanoic acid.

In another exemplary embodiment, the paint removal agent 22 can be provided under the trade name MULTI-STRIP PROFESSIONAL PAINT REMOVER by Sunnyside Corporation having offices located at 225 Carpenter Avenue, Wheeling, Ill., 60090, USA. The MULTI-STRIP PROFESSIONAL PAINT REMOVER product may be made of, in weight percentages, from 15-35% N.Methyl-2 Pyrrolidone, from 20-35% dimethyl glutarate, from 5-10% dimethyl adipate, from 5-15% dimethyl succinate, from 1-2% formic acid, and from 20-40% non-toxic/non-hazardous components. This product may be a creamy gel in appearance, and may be partially soluble in water.

In accordance with yet another exemplary embodiment, the paint removal agent 22 may be a paint and varnish remover provided under the product name SAFEST STRIPPER™ Paint and Varnish Remover by 3M having offices located at 3M Center, St. Paul, Minn. 55144-1000, USA. The SAFEST STRIPPER™ Paint and Varnish Remover product may be made of, in weight percentages, from 65%-75% water, from 20%-30% dimethyl adipate, from 1%-5% dimethyl glutarate, and from 1%-5% smectite. The SAFEST STRIPPER™ Paint and Varnish Remover may be white in color with a slight ester odor and can be liquid in general physical form. The SAFEST STRIPPER™ Paint and Varnish Remover may have a specific gravity from 1.00-1.03, a pH of approximately 7, a viscosity from 60000.0-110000.0 centipoise, and may be soluble in water either partially or fully.

The dimethyl adipate that is used as a component of the paint removal agent 22 may be insoluble in water, may have a specific gravity from 1.055-1.065, may have a melting point of 8 degrees Celsius, and may be used as a solvent in the paint removal agent 22.

Still further, another exemplary embodiment exists in which the paint removal agent 22 is a latex based paint and graffiti remover that is water-based and biodegradable provided under the name Motsenbocker's Lift Off #5 by Motsenbocker's Lift Off, Inc. having offices with a mailing address of P.O. Box 90947, San Diego, Calif. 92169, USA. The Motsenbocker's Lift Off #5 product may be made of, in weight percentages, less than 5% acetone, and trade secret ingredients. The Motsenbocker's Lift Off #5 product may be a clear liquid in appearance with a mild odor, and be mixable with water, may have a pH from 11.9-12.1, a specific gravity of 1.0, and can have a vapor density so as to be heavier than air.

An additional exemplary embodiment of the paint removal agent 22 may be ELEPHANT SNOT® that is a graffiti 50 removal formula provided by Graffiti Solutions, Inc., having offices located at 2263 McKnight Road North, Suite 2, North Saint Paul, Minn., 55109, USA. This product may be a gel that can cling to vertical surfaces without dripping, may be biodegradable, may have a low rate of evaporation, may be used on surfaces with graffiti 50 that are "porous" and irregular in texture, made of a trade secret ingredient, may have a water solubility of 100% miscible, may have a specific gravity of 1.07.

In accordance with another arrangement, the paint removal agent 22 may be SUPERSTRIP® that is provided by Savogran Company having offices located at 259 Lenox Street, Norwood, Mass., 02062, USA. This product may include dichloromethane that may be included by weight of the product from 85%-90%, methanol that may be from 5%-10% by weight of the product, toluene that may be from 0%-5% by weight of the product, and paraffin wax that may be from 0%-5% by weight of the product. This product may have a boiling point of 104 degrees Fahrenheit, a specific gravity of 1.20, and appreciable solubility in water, and may contain 9% by weight of volatile organic compounds.

The paint removal agent 22 may be or include a dibasic ester (DBE®) in some embodiments which are refined dimethyl esters of adipic, glutaric, and succinic acids. This component may be readily soluble in alcohols, ketones, ethers, and hydrocarbons, and may be only slightly soluble in water and higher paraffins. Dibasic esters may be obtained by Invista® having offices located at Three Little Falls Centre, 2801 Centerville Road, Wilmington, Del., 19808, USA. The dibasic ester may include dimethyl adipate, dimethyl glutarate, dimethyl succinate, methanol, and water. Various configurations of dibasic esters can be provided such that these components are in different weight percentages as per the following chart available from and belonging to Invista®:

| | Typical Composition, wt % | | | | | | |
|---|---|---|---|---|---|---|---|
| | DBE | DBE-2 | DBE-3 | DBE-4 | DBE-5 | DBE-6 | DBE-9 |
| Dimethyl Adipate | 21 | 24 | 89 | — | 0.1 | 98.7 | 0.2 |
| Dimethyl Glutarate | 59 | 75 | 10 | 0.3 | 99 | <0.5 | 66 |
| Dimethyl Succinate | 20 | 0.3 | 0.2 | 98.4 | 0.4 | <0.1 | <0.1 |
| Methanol | 0.2 | <0.1 | <0.1 | <0.1 | <0.1 | <0.1 | <0.1 |
| Water | 0.05 | 0.02 | 0.04 | 0.02 | 0.03 | 0.03 | 0.04 |

In accordance with other exemplary embodiments, the paint removal agent 22 can be made of or include N-Methyl-2-pyrrolidone (NMP). Other names for this compound include 1-methyl-2pyrrolidone, methylpyrrolidone, m-pyrrole, and pharmasolve. This compound has a 5-membered lactam structure.

The paint removal agent 22 may include any one of, or any combination of, formic acid, N-Methyl-2-pyrrolidone, or dibasic esters. In some versions, the paint removal agent 22 includes only one of these components, whereas in other versions the paint removal agent 22 includes two or even all three of these components. In certain exemplary embodiments, the paint removal agent 22 includes one or more of these three components with other materials. These three components make up a group or family of materials of the paint removal agent 22 that can be used herein.

It is to be understood that the above-mentioned embodiments of the paint removal agent 22 are only exemplary and that others are possible. The ranges mentioned may be expanded or contracted, and the ingredients mentioned can be combined between the different products such that a different paint removal agent 22 used in the method 10 has ingredients from two or more of the above-mentioned embodiments. Further, it is to be understood that the ingredients mentioned above for the various paint removal agents 22 may not be all of the ingredients present in the various paint removal agents 22 and that others not listed can be included. The paint removal agent 22 may include various esters that are chemical compounds derived from the reaction of an oxoacid with a hydroxyl compound such as an alcohol or phenol. Further, paint removal agent 22 may include various ethanes. The paint removal agent 22 may be any substance, such as a paste, gel, liquid, solid, chemical compound, etc., capable of effecting removal of the painted marking 24 either completely or partially.

Figure 4A:
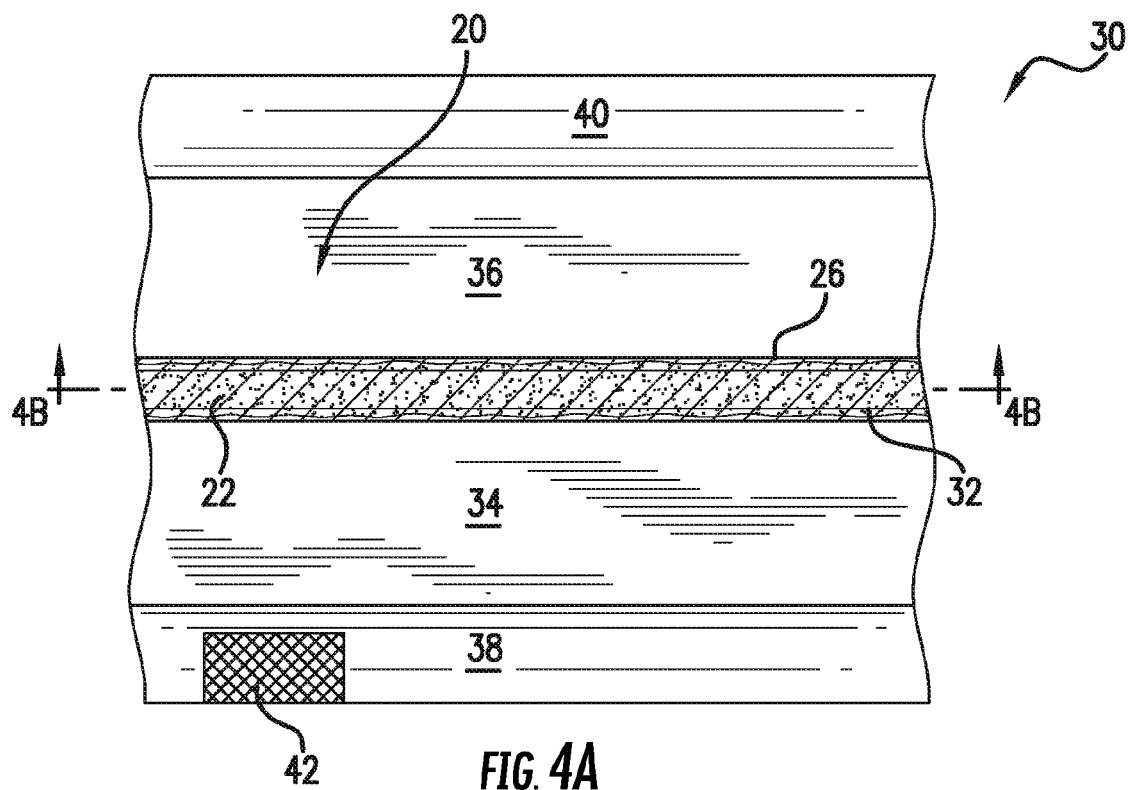
FIG. 4A is a top view of the road of FIG. 3A with a covering applied on top of the paint removal agent.
Figure 4B:
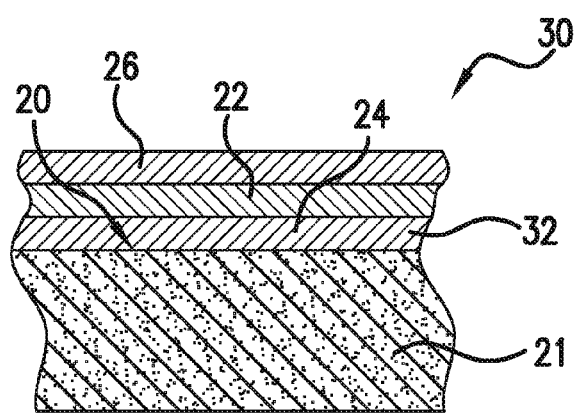
FIG. 4B is a cross-sectional view taken along line 4B-4B of FIG. 4A.

The method 10 may move from step 12 to step 14 in which a covering 26 is applied to the paint removal agent 22. The covering 26 can be applied in any manner such as being rolled on, placed on manually by hand, or having paint removal agent 22 previously applied to the covering 26. The covering 26 may engage the paint removal agent 22 such that the paint removal agent 22 is located between the covering 26 and the painted marking 24 as shown with reference to FIGS. 4A and 4B. The covering 26 may be provided in order to prevent all or some of the paint removal agent 22 from evaporating before it can effectively function to remove the painted marking 24. The paint removal agent 22 may contain alcohol that may evaporate when exposed to air, or other components that may evaporate when exposed to air. Although the paint removal agent 22 may work to remove the painted marking 24 when not covered, it may not work effectively when not covered. This is because the painted marking 24 is specifically designed to have increased adhesion and durability due to its external application and due to its need for these specific characteristics during its use. The covering 26 may function to keep the paint removal agent 22 engaged against the painted marking 24 during application and may function to reduce exposure of the paint removal agent 22 to the environment so that it will not degrade such that it will not lose effectiveness when working to remove the painted marking 24.

The covering 26 may be applied so that it covers the entire amount of the paint removal agent 22, or so that it covers a portion of the paint removal agent 22 while other portions are uncovered. As shown with reference to FIGS. 4A and 4B, the covering 26 covers the entire paint removal agent 22 on the road 30 such that a portion of the covering 26 extends beyond the paint removal agent 22 on either side of the paint removal agent 22 approaching the shoulders 38 and 40. The covering 26 may be applied so as to be larger than the footprint of the paint removal agent 22 to ensure that the paint removal agent 22 is properly covered. The covering 26 may be of a larger footprint than the footprint of the paint removal agent 22 so that air, wind, or debris are hindered from flowing under the covering 26 and against or onto the side areas of the paint removal agent 22.

The covering 26 may be adhered to the surface 20 through the use of tape, glue, or weighted objects. Additionally or alternatively, the covering 26 need not be adhered to the surface 20 but may simply lie on the surface 20 and/or the top of the paint removal agent 22 without being otherwise fixed thereon. The weight of the covering 26, and or natural tackiness of the paint removal agent 22 may function alone or in combination to properly secure the covering 26 in place.

In accordance with certain exemplary embodiments, the covering 26 may be dissolvable either partially or fully in water. In this regard, the application of water to the covering 26 may cause the covering 26 to lose its structural integrity such that it breaks up into smaller pieces. The covering 26 may be made of components such that when water is applied thereto, these components of the covering 26 dissolve in water and cause the remaining components to lose their ability to cover the full amount of the paint removal agent 22. As such, the covering 26 functions to cover the paint removal agent 22 when water is not applied so that the paint removal agent 22 is protected from evaporation and other environmental conditions, and functions to allow the paint removal agent 22 to be exposed to the environment and uncovered when the covering 26 is exposed to water.

The covering 26 may be made of any material capable of providing a barrier layer against air, either fully or partially, when not subjected to a threshold amount of water, and no longer providing a barrier layer against air once a threshold amount of water has been applied to the covering 26. The covering 26 may be a water-soluble film. The covering 26 may be made of plastic in accordance with certain exemplary embodiments. The covering 26 may be a fabric material. However, in other arrangements, the covering 26 is not made of a fabric material and is thus not a fabric.

In accordance with one exemplary embodiment, the covering 26 may be made of polyvinyl alcohol, which is a water soluble synthetic polymer. Polyvinyl alcohol has excellent film forming, emulsifying, and adhesive properties. This material may be resistant to oil, grease and solvent, and may be odorless and nontoxic. Polyvinyl alcohol may have high oxygen and aroma barrier properties, but these properties may be dependent upon humidity. The more water absorbed by the material may cause the tensile strength of the material to be reduced, but may increase elongation and tear strength. Polyvinyl alcohol may be fully degradable and may be a quick dissolver.

Polyvinyl alcohol used as covering 26 may have a density from 1.19-1.31 $g/cm^3$, a boiling point of 228 degrees Celsius, and a melting point of 230 degrees Celsius. Polyvinyl alcohol may be known as, or certain types of polyvinyl alcohol may be, PVOH, Poly(Ethenol), Ethenol, homopolymer, PVA (polyvinyl acetate), Polyviol, Vinol, Alvyl, Alkotex, Covol, Gelvatol, Lemol, Mowiol. The covering 26 may be made of a material that includes ingredients such as polyvinyl alcohol. For example, the covering 26 may be a polyvinyl nitrate or a polyvinyl acetal that include polyvinyl alcohol as a raw material. The polyvinyl alcohol may be arranged so that it is a water-soluble film. In accordance with other exemplary embodiments, the covering 26 may be other types of vinyl polymers.

Polyvinyl alcohol may be formed through a reaction of acetic acid with acetylene to form vinyl acetate. The vinyl acetate molecules may join with one another to form polyvinyl acetate. Methyl alcohol may be reacted with the polyvinyl acetate to cause alcohol groups to substitute with the acetate groups. In this manner, polyvinyl alcohol may be formed.

In accordance with one exemplary embodiment, the covering 26 may be MOWIFLEX TC® thermoplastic processable polyvinyl alcohol provided by Kuraray Holdings U.S.A., Inc., having offices located at 101 East $52^{nd}$ Street, $26^{th}$ Floor, New York, N.Y., 10022, USA. This product may be soluble in water, may form a clear and glossy film, and may have high tensile strength, may be easily printable thereon, may have a low electrostatic surface charge, may be colorable, may form a high barrier effect towards oxygen, nitrogen, carbon dioxide, and organic substances such as fragrances and aromas. This product may be incorporated into an additional product such as a plastic, may be biodegradable, and may be a thermoplastic compound.

The covering 26 may be placed onto any of the aforementioned paint removal agents 22 and will not be dissolved or degraded by any of the aforementioned paint removal agents 22 such that the covering 26 will still function to provide a barrier layer and reduce evaporation of the paint removal agent 22. In this regard, the covering 26 may be polyvinyl alcohol and may be capable of being placed upon and working with any of the aforementioned paint removal agents 22 without dissolving or tearing such that a barrier layer of the paint removal agent 22 will be formed.

The covering 26 may be a solid at room temperature. The covering 26 may include acetate groups that are replaced by alcohol groups, may dissolve in hot water, may dissolve in cold water, may dissolve in both hot and cold water, and may be insoluble in organic chemicals such as grease, fats, or oils. The covering 26 may be organic or inorganic in accordance with various exemplary embodiments.

In accordance with certain exemplary embodiments, a dye may be present in the paint removal agent 22 and/or covering 26 in order to allow users to associate the components of method 10 with the specific color. The dye may be BLAZON® BLUE 2×2.5 provided by Milliken Chemical having a mailing address of P.O. Box 1926, Spartanburg, S.C. 29303, USA. The dye may be a concentrated colorant and may be made of 100% proprietary colorant blend. The dye may be non-stain marking such that when the paint removal agent 22 and/or covering 26 engage the surface 20, the dye will not cause a stain to be made on the surface 20. It is to be understood that the dye is an optional component and need not be present in all embodiments of the method 10.

The method 10 may then move to step 16 in which the user will wait some amount of time for the paint removal agent 22 to work to remove the painted marking 24 from the surface 20. The amount of time needed to wait is dependent upon environmental conditions, the specific paint removal agent 22 used, and the specific painted marking 24 and surface 20 that are in play. It may be the case that at least one hour of time will have to be spent waiting in step 16 for the paint removal agent 22 to facilitate removal. If the temperature is cool or cold, it may be the case that at least 7 or 8 hours will have to be spent waiting in step 16 for the paint removal agent 22. Any amount of time may be spent waiting in step 16. For example, from 5 minutes to 2 days may be spent waiting in step 16 in accordance with various exemplary embodiments. Further, the step 16 may not be used in other embodiments when the paint removal agent 22 functions quickly to remove the painted marking 24.

Figure 5A:
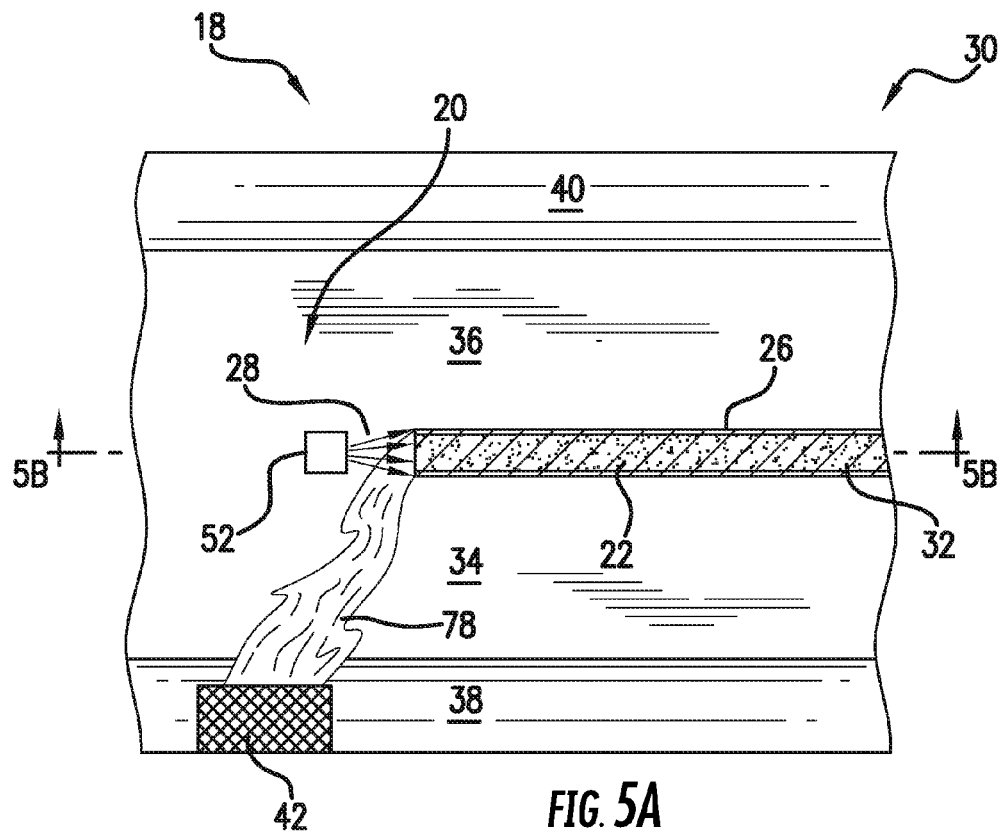
FIG. 5A is a top view of the road of FIG. 4A with fluid applied to wash off the combined covering, paint removal agent, and painted marking.
Figure 5B:
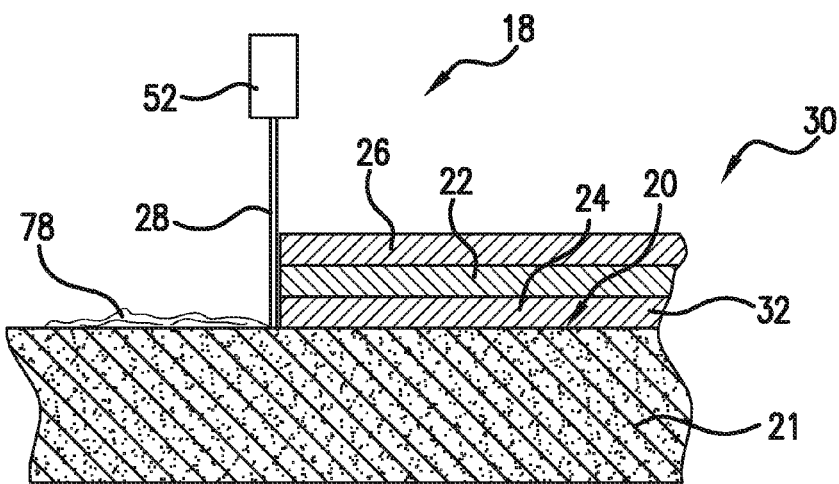
FIG. 5B is a cross-sectional view taken along line 5B-5B of FIG. 5A.

After some amount of time has been spent waiting in step 16, the method 10 may move to step 18 in which fluid 28 may be applied to the covering 26, the paint removal agent 22, and the painted marking 24 in order to facilitate removal of these components from the surface 20. Step 18 may be illustrated with reference to FIGS. 5A and 5B in which a pressure washer 52 is used to apply fluid 28. The fluid 28 may be water in certain exemplary embodiments. In accordance with other exemplary embodiments, the fluid 28 may be air, oil, solid particles, gel, paste, or variously configured. The pressure washer 52 may be capable of running at any pressure to deliver fluid 28. For example, the pressure washer 52 may operate at a pressure of 3500 psi or greater and may use fluid 28 that is water in accordance with certain exemplary embodiments. The pressure may be at any pressure, and in some embodiments may not be above 10,000 psi. It may be the case that ultra high pressure (UHP) is 20,000 psi or above, and the pressure washer 52 may operate at these levels. The pressure washer 52 may function at any psi in accordance with different exemplary embodiments. The pressure washer 52 can be carried and actuated manually by the user, or the pressure washer 52 may be incorporated into a vehicle or other apparatus. The use of a pressure washer 52 may not be needed in other embodiments of the method 10. For example, the fluid 28 may simply be dumped onto the covering 26, or may be applied without a pressure washer 52.

The fluid 28 may be water and may function to wet the covering 26 when applied. The covering 26 will absorb or otherwise engage the water 28 and be broken up as the covering 26 may be dissolvable in water. The water 28 will then function to engage the paint removal agent 22 and wash same away. Next, the water 28 will engage the painted marking 24 and remove the painted marking 24 from the surface 20. The painted marking 24 may have been weakened from adhesion with the surface 20 by the paint removal agent 22, and the pressure and/or water from the fluid 28 will function to wash or remove same from the surface 20.

As such, the step 18 may involve applying the fluid 28 such that the fluid 28 first engages the covering 26 before engaging either the paint removal agent 22, the painted marking 24, or the surface 20. The fluid 28 may be applied as the covering 26 engages the paint removal agent 22 such that the covering 26 is not manually removed prior to application of the fluid 28. The fluid 28 engages the covering 26 at the same time as when the covering 26 engages the paint removal agent 22 such that the covering 26 is at some point located between the fluid 28 and the paint removal agent 22. The fluid 28 is applied as the covering 26, paint removal agent 22, and painted marking 24 are all assembled with one another as a combined assembly. The fluid 28 is applied to this assembly while the paint removal agent 22 is covered and thus not exposed to the environment. The paint removal agent 22 engages both the painted marking 24 and the covering 26 simultaneously as the fluid 28 is applied for removal. The fluid 28 first engages the covering 26 and then breaks through this layer before subsequently engaging the paint removal agent 22 and then the painted marking 24.

The fluid 28 itself functions to remove the covering 26 and the other components. The covering 26, paint removal agent 22, painted marking 24, and fluid 28 will combine with one another after application of fluid 28 into washed off components 78. The washed off components 78 may flow via normal draining of the road 30 and off of surface 20. The washed off components 78 may flow into a drain 42 located in the shoulder 38. Additionally or alternatively, the washed off components 78 may flow off of the surface 20 in any variety of ways. The components 22, 24 and 26 may be environmentally friendly so that they can be washed off and eliminated in the same channels rain water drains from the road 30. However, if one or more of the components 22, 24 and 26 include materials that may damage the environment they can be appropriately removed. For example, if the painted marking 24 includes lead the washed off components 78 may be vacuumed up by a machine and the components 22, 24, 26 and 28 may be disposed of in the normal channels for materials of this type. As the amount of water 28 that is used for removal in method 10 is minimal, a lesser amount of waste must be vacuumed and disposed of thus leading to decreased costs of removal.

The fluid 28 may be applied such that the pressure washer 52 can be moved down the road 30 along the length of the lane divider 32 at an average rate of at least 4 seconds per foot (ie 3 inches per second). If a more powerful pressure washer 52 is used, the removal rate can be faster than 4 seconds per foot (ie 3 inches per second). The method 10 allows for the use of a pressure washer 52 that may be operated at a lower pressure than those needed for the removal of painted markings 24 when not using the method 10. As such, the method 10 may increase the life of equipment because less pressure is needed to effect removal of the painted markings 24. The painted markings 24 may extend for any length on surface 20. As such, the method 10 may be set up over any length of the surface 10 such that fluid 28 may be applied along a length from 1-10 miles, from 10-20 miles, up to 100 miles, or greater than 100 miles in certain embodiments.

Although described as using a pressure washer and fluid 28 that is water to remove the painted marking 24, covering 26, and paint removal agent 22, it is to be understood that these are not used in other embodiments. For example, abrasive blasting may be used instead of a pressure washer and the fluid 28 may be sand or other abrasive solids that are directed onto the covering 26, paint removal agent 22, and painted marking 24 to remove these components in accordance with certain exemplary embodiments.

Figure 6A:
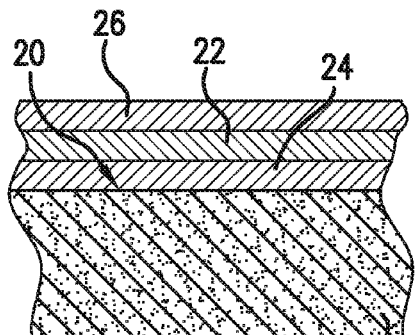
FIG. 6A is a cross-sectional view of a surface, painted marking, paint removal agent, and covering.
Figure 6B:
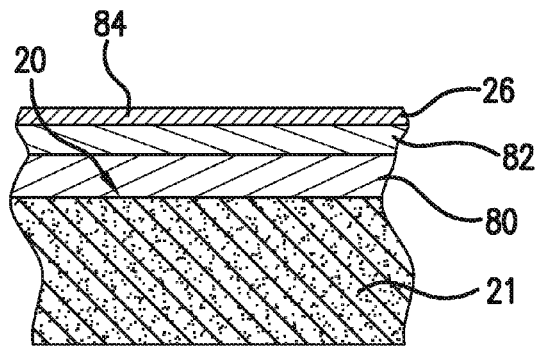
FIG. 6B is a cross-sectional view of FIG. 6A in which a portion of the covering is dissolved and in which the paint removal agent has combined with the painted marking.

FIGS. 6A and 6B illustrate another embodiment of some of the components used in the method 10. In FIG. 6A, the painted marking 24 is illustrated on top of the surface 20. A layer of paint removal agent 22 covers the painted marking 24, and a layer of covering 26 covers the paint removal agent 22. This arrangement may be the same as those previously discussed in which the covering 26 functions to reduce or eliminate evaporation of the paint removal agent 22 to increase its effectiveness. During the waiting step 16, the paint removal agent 22 may combine with the painted marking 24 to create a combined painted marking/paint removal agent 80. This may be the case because the paint removal agent 22 may mix and homogenize with the painted marking 24 as it is breaking up. In effect, some or all of the paint removal agent 22 may be mixed with the painted marking 24 into combination 80 as the paint removal agent 22 functions to dissolve the painted marking 24, break down the painted marking 24, or otherwise remove adhesion between the painted marking 24 and the surface 20.

Also as shown with reference to FIG. 6B, the paint removal agent 22 may include some amount of moisture. This moisture may function to dissolve a part of the covering 26 as the covering 26 may be dissolvable by water. A dissolved covering/paint removal agent 82 is shown in FIG. 6B on top of and engaging the combined painted marking/paint removal agent 80. The dissolved covering/paint removal agent 82 may include a portion of the covering 26 and the paint removal agent 22. In accordance with certain exemplary embodiments, the dissolved covering/paint removal agent 82 combines with the combined painted marking/paint removal agent 80 such that the painted marking 24, the paint removal agent 22, and a portion of the cover 26 are all homogenized into one combined substance that engages the surface 20.

Upon dissolving of a portion of the covering 26 due to water content in the paint removal agent 22, a remaining covering portion 84 of the covering 26 will still be present to function as a barrier as previously described. The partial melting of the covering 26 may function as an adhesive so as to cause the remaining covering portion 84 to adhere to dissolved covering/paint removal agent 82. The fluid 28 may be applied to the remaining covering portion 84 to dissolve same and then wash off the portion 84 along with the elements 80 and 82 from the surface 20 in basically the same manner as previously discussed. It is to be understood that discrete, identifiable layers of the various components may not be present in accordance with different embodiments. For example, layers 80 and 82 could be combined with one another into one layer covered by the remaining covering portion 84. The method 10 may involve the use of components that interact with one another in different manners before they are removed from the surface 20. Further, it is to be understood that the interactions in FIG. 6B are only exemplary and that others are possible.

Figure 7:
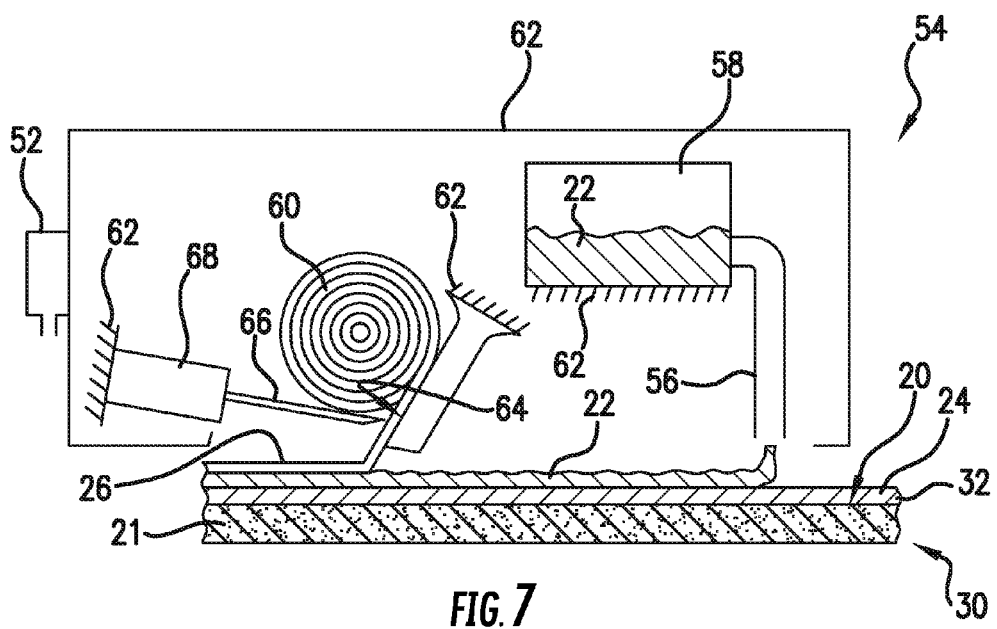
FIG. 7 is a schematic side view of an apparatus for applying paint removal agent and covering to a painted marking in accordance with one exemplary embodiment.

An apparatus 54 capable of effecting steps 12 and 14 of the method is disclosed with reference to FIG. 7. The apparatus 54 may include a frame 62 and can be attached to a vehicle or may be a stand alone device. The apparatus 54 can be fitted with wheels (not shown) to cause the apparatus 54 to move down the length of the road 30. The apparatus 54 may include a tank 58 rigidly carried by the frame 62 that houses the paint removal agent 22. The tank 58 may be fitted with a compressor to force the paint removal agent 22 therefrom. An applicator 56 may extend from the tank 58 to an area adjacent the surface 20. The paint removal agent 22 may be transferred from the tank 58 to applicator 56 that then applies the paint removal agent 22 to the painted marking 24. The applicator 56 may function to spray the paint removal agent 22 or to apply same through contact application to the painted marking 24. The viscosity or make-up of the paint removal agent 22 may dictate the type of applicator 56 used.

The applicator 56 is shown applying the paint removal agent 22 to the painted marking 24. The apparatus 54 can be moved so that the paint removal agent 22 is applied along the length of the painted marking 24. The applicator 56 may apply the painted marking 24 a width sufficient to cover the width of the painted marking 24, or the apparatus 54 can be driven, moved back to the start of the painted marking 24 and moved in a similar manner to clear off the remaining width of the painted marking 24.

The apparatus 54 may also include a roll 60 of covering 26. The roll 60 may be wound and carried by frame 62 such that the roll 60 unwinds relative to frame 62. The covering 26 may be unwound and applied to the previously applied paint removal agent 22. The covering 26 may adhere to the paint removal agent 22 due to the natural tackiness of the paint removal agent 22 and/or because of the weight of the covering 26 once placed onto the paint removal agent 22. The apparatus 54 may thus function to simultaneously apply paint removal agent 22 and covering 26. The covering 26 application section is located rearward of the applicator 56 so that the covering 26 will be placed upon the applied paint removal agent 22 and the apparatus 54 thus moves to the right as shown in FIG. 7.

A pneumatic actuator 68 is mounted to the frame 62 and can be actuated to move a cutting blade 66 in a linear direction. The covering 26 is unwound from roll 60 over a cutting surface 64 that may apply tension to the covering 26 before it is placed onto the paint removal agent 22. A tension roll (not shown) may also be present for imparting tension. The pneumatic actuator 68 may actuate in order to cause the cutting blade 66 to move into engagement with the covering 26 to cut off the covering 26 and cause same to be disengaged from the roll 60. The severed portion of the covering 26 is thus pinched between the cutting surface 64 and the cutting blade 66. The covering 26 can be separated when the desired amount of covering 26 has been unwound so that the paint removal agent 22 is adequately covered. It is to be understood that various arrangements of the cutting blade 66 can be developed in other exemplary embodiments and that the manner shown is only one possibility. Further, a pressure washer 52 may be mounted to frame 62 to effect the fluid 28 step 18. However, this step will most likely be performed later after the waiting step 16 and not upon immediate application of the covering 26. The pressure washer 52 need not be incorporated into the apparatus 54 in other embodiments and can be on a separate apparatus or simply a stand alone device carried or pushed by the user along the road 30.

Figure 8:
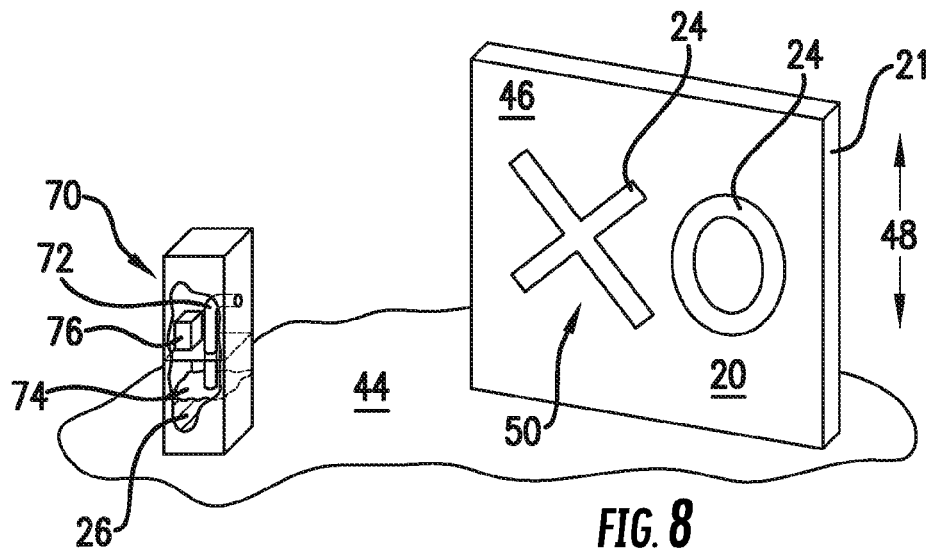
FIG. 8 is a perspective view of a vertical surface onto which graffiti is applied.

The method 10 can be used on various types of painted markings 24 whether found inside or outside. The painted markings 24 need not be associated with a road 30 but can be found on the surface 20 of any base 21 such as a bridge, building, sidewalk, parking lot, railroad car, vehicle, indoor soccer floor, indoor basketball floor, roller hockey ring, or rock formation. The surface 20 and base 21 may be made at least partially of petroleum and thus petroleum based in certain embodiments. Further, although shown in conjunction with a surface 20 that is horizontal in orientation, the surface 20 can be vertical or arranged in any type of orientation in other embodiments of the method 10. With reference now to FIG. 8, painted markings 24 are located on a vertically oriented surface 46 of a wall 21. The vertical direction 48 is shown and is arranged so that it is perpendicular to the surface of ground 44. As such, liquid located on surface 20 may flow downwards in the vertical direction 48 since the surface 20 is a vertical surface 46 and engage the ground 44. The markings 24 in FIG. 8 may be graffiti 50 that is placed onto the surface 20 of wall 21. The method 10 may be used by a city government, business owner, or homeowner in removing graffiti 50 from the wall 21.

The user may use the same steps as previously discussed such that the paint removal agent 22 is applied to the painted markings 24. The paint removal agent 22 may be of a consistency that allows it to remain on the vertical surface 46. In this regard, the paint removal agent 22 can be a viscous substance that is naturally tacky so that it can remain on the vertical surface 46 and function to remove the painted marking 24 from the vertical surface 46. The covering 26 application step 14 may be performed in manners previously discussed in various exemplary embodiments. However, with reference now to FIG. 9, step 14 is performed in a different manner from those previously discussed in that the covering 26 is sprayed onto the painted marking 24. The covering 26 may be initially provided as a shredded dissolvable covering 86. The shredded dissolvable covering 86 may be made of covering 26 material previously discussed that is in smaller, shredded pieces. For example, the shredded dissolvable covering 86 may be made of pieces of plastic that are torn up or formed into portions without a surface area larger than 1 square inch on both sides. In other embodiments, the pieces of shredded dissolvable covering 86 may have surface areas that are not larger than 0.5 square inches, not larger than 1.5 square inches, or not larger than 2.0 square inches on both sides. The small pieces of shredded dissolvable covering 86 can be applied in a variety of manners. The shredded dissolvable covering 86 may be provided so that it resembles or has a shape/consistency of confetti.

Figure 9:
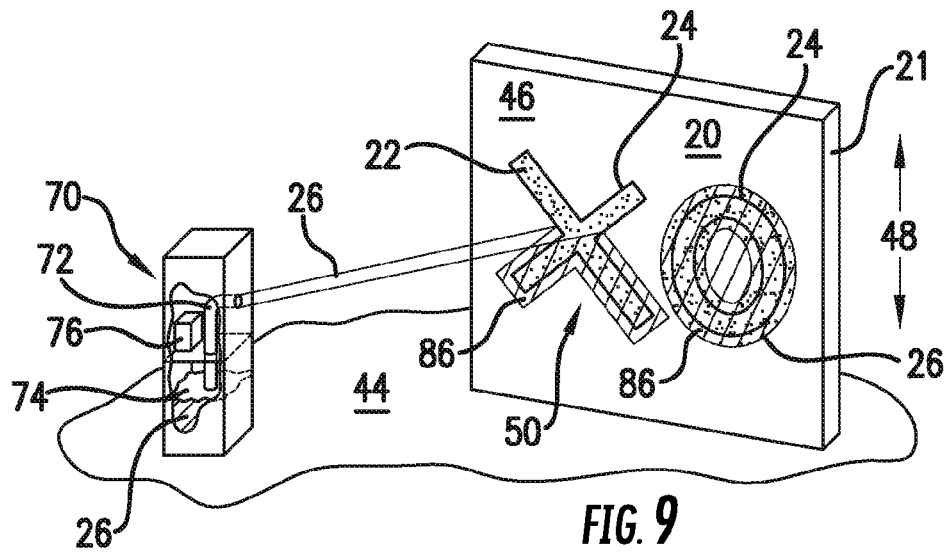
FIG. 9 is a perspective view of an apparatus for applying a covering that is shredded dissolvable plastic onto graffiti onto which paint removal agent is applied.

An apparatus 70 may be provided and used for the application of the shredded dissolvable covering 86 in step 14. The apparatus 70 may include a tank 74 into which the shredded dissolvable covering 86 is stored. A compressor 76 can be included in the apparatus 70 and may function to place the shredded dissolvable covering 86 in the tank 74 under pressure. A sprayer 72 may be included in the apparatus 70, and may be actuated in order to cause compressed shredded dissolvable covering 86 to be sprayed onto the paint removal agent 22. As shown in FIG. 9, the shredded dissolvable covering 86 is sprayed onto the "O" portion of the graffiti 50 and is partially applied to the "X" portion of graffiti 50 by the apparatus 70. The user may actuate apparatus 70 so that the shredded dissolvable covering 86 is adequately applied to all of the paint removal agent 22 as needed. In other embodiments, the user may apply the shredded dissolvable covering 86 in a variety of manners such as through hand application, or by way of a hand held contact applicator, or hand held sprayer. The shredded dissolvable covering 86, instead of confetti like composition, may be a foam in some embodiments. As such, it is to be understood that as used herein the term shredded dissolvable covering is broad enough to include a foam that can be the covering 26 that is applied or sprayed onto the paint removal agent 22.

Figure 10:
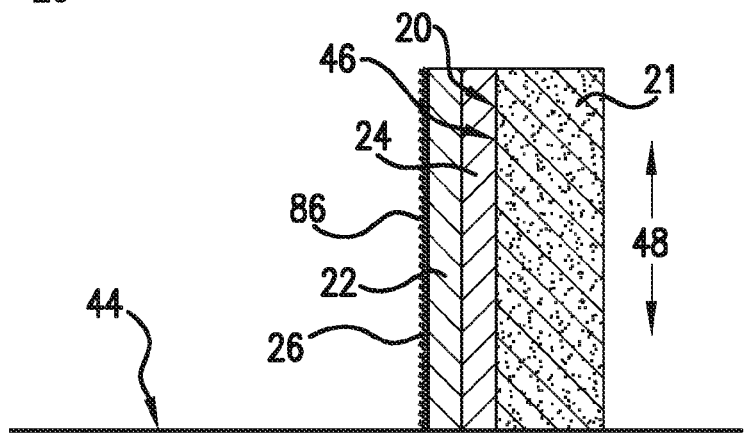
FIG. 10 is a side view of the shredded dissolvable plastic covering applied to the paint removal agent on the vertical surface.

With reference now to FIG. 10, the shredded dissolvable covering 86 is applied to the paint removal agent 22 to cause a barrier layer to be formed thereon. The pieces of the shredded dissolvable covering 86 may be naturally adhesive to one another due to the static attractiveness to one another. Further, the pieces of the shredded dissolvable covering 86 may engage the paint removal agent 22 and be retained thereon through tackiness and/or through partially dissolving onto the paint removal agent 22. The shredded dissolvable covering 86 can be sprayed onto the paint removal agent 22 until a suitable barrier layer is formed to prevent evaporation of the paint removal agent 22 as it works to remove the painted marking 24. Once an adequate amount of time has elapsed, the user may remove the shredded dissolvable covering 86, the paint removal agent 22, and the painted marking 24 from the vertical surface 46 through the use of a pressure washer 52 or other means for fluid 28 delivery as previously discussed. Also, although shown as being used in connection with a vertical surface 46 for the removal of graffiti 50, the shredded dissolvable covering 86 can be used in the method 10 when the painted markings 24 are not graffiti 50 and/or found on a vertical surface 46. For example, with reference back to FIGS. 4A and 4B, the covering 26 may be applied to the paint removal agent 22 covering the lane divider 32 on the road 30 by being formed through shredded dissolvable covering 86 applied by use of a sprayer or other applicator.

The method 10 has been described as having the sequential steps of applying a paint removal agent 22 to the painted marking 24 in step 12 and then, subsequently applying the covering 26 to the paint removal agent 22 in step 14. However, it is to be understood that other versions of the method exist in which step 14 is performed first in time in view of step 12. For example, the paint removal agent 22 may first be applied to the covering 26, and then subsequently the combined covering 26 and paint removal agent 22 may be applied to the painted marking 24 such that the paint removal agent 22 engages the painted marking 24. As such, the various steps 12, 14, 16 and 18 of the method 10 can take place simultaneously with one another or be ordered in various time positions. Also, steps additional to or less than those specifically disclosed in the method 10 in the discussed embodiments are possible in yet other exemplary embodiments of the method 10.

Although described as being used in outdoor applications, it is to be understood that the method 10 may be used either indoors to remove painted markings 24, outdoors, or combinations thereof. The method 10 may be used by a homeowner in removing painted markings 24 around the house. As such, the method 10 may be used in a wide variety of applications in various settings.

Figure 11:
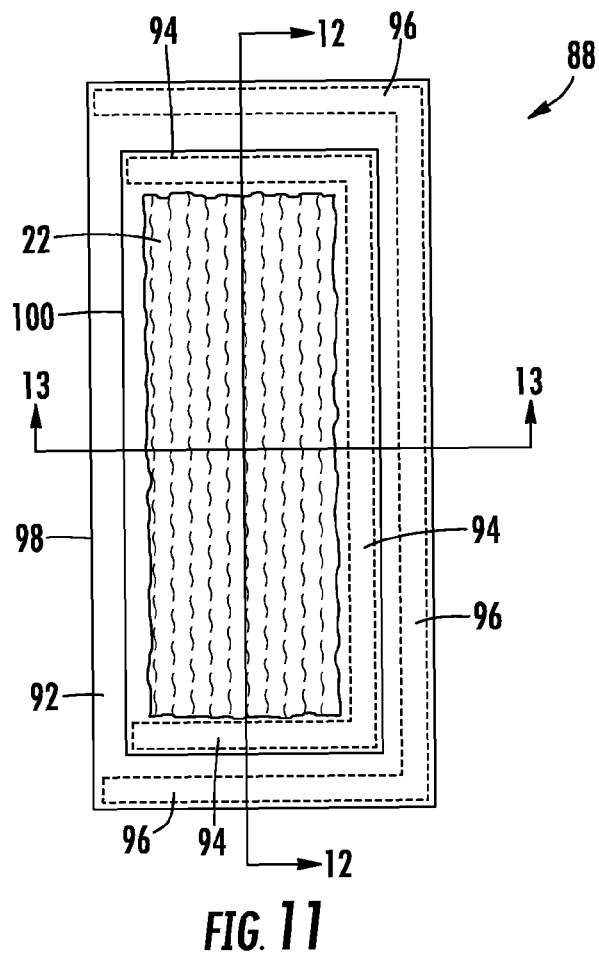
FIG. 11 is a top, plan view of an apparatus in accordance with one exemplary embodiment.
Figure 12:
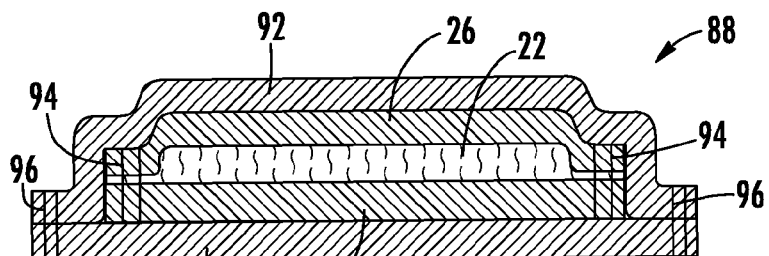
FIG. 12 is a cross-sectional view taken along line 12-12 of FIG. 11.
Figure 13:
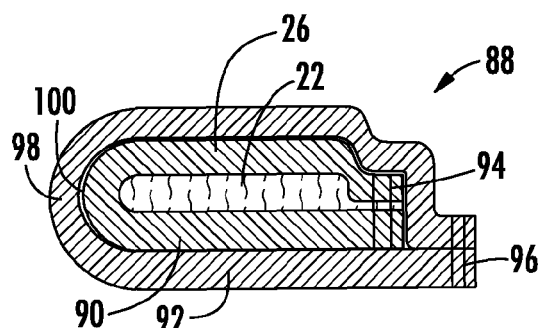
FIG. 13 is a cross-sectional view taken along line 13-13 of FIG. 11.

With reference now to FIGS. 11-13, an apparatus 88 in accordance with another exemplary embodiment is illustrated. The apparatus 88 may be referred to as paint stripper tape or a blanket in certain embodiments and can be used to remove painted markings 24. The apparatus 88 may include a first covering 26 and a second covering 90 with a layer of paint removal agent 22 located between the coverings 26 and 90. A storage covering 92 may also be included and can contain the first covering 26, the second covering 90, and the paint removal agent 22. The storage covering 92 may be used for storage and transport purposes such that when the apparatus 88 is to be applied, the user can open the storage covering 92, discard the storage covering 92, and then apply the first covering 26, second covering 90, and paint removal agent 22. The storage covering 92 may prevent the other components from becoming wet and dissolving unintentionally before desired.

The storage covering 92 and the first and second coverings 26 and 90 can be provided so that they are in a closed configuration. The storage covering 92 may be a single rectangular sheet that is folded over itself to form folded edge 98 such that the first covering 26, second covering 90, and paint removal agent 22 are located between the two folded sections. The three open ends of the folded storage covering 92 may be sealed through the use of seal 96 that can extend around all three of the open ends. The seal 96 may be effected through heat and pressure, sonic welding, mechanical connections, adhesion, or any other means capable of attaching the storage covering 92 to itself. The seal 96 may be made of the same material as the rest of the storage covering 92, or may be made of material different from the other portions of the storage covering 92. Although described as being a single sheet that is folded at the folded edge 98, the storage covering 92 may be two sheets in other embodiments. The two sheets may surround the coverings 26 and 90 such that one sheet is on the bottom, and the other sheet is on the top. Seal 96 may be located around all four sides of the two sheets to secure the storage covering 92. In other arrangements, the storage covering 92 may be made from 3-20 different sheets. Although described as being rectangular in shape, the storage covering 92 can be variously shaped in other exemplary embodiments.

The second covering 90 is positioned so that it is between the paint removal agent 22 and the bottom of the storage covering 92. The second covering 90 and the first covering 26 may be formed from a single sheet of material. In this regard, the single sheet of material may be folded at the folded edge 100 and the bottom portion can be designated as the second covering 92 while the top portion is the first covering 26. In this type of assembly, the paint removal agent 22 can be painted or sprayed onto the single sheet of material and then the single sheet can be folded over on top of the paint removal agent 22. The three open edges of the single sheet may be closed through the use of seal 94 on all three edges. The seal 94 can be arranged and configured with respect to the first and second coverings 26 and 90 the same way as seal 96 with respect to the storage covering 92 and a repeat of this information is not necessary. Further, although described as being a single sheet, the first covering 26 and the second covering 90 can be separate sheets in different embodiments. Here, the first covering 26 and second covering 90 can be positioned so that the paint removal agent 22 is located between them, and the seal 94 can be applied around all four edges to seal the first covering 26 and second covering 90. In yet other arrangements, the first covering 26 and the second covering 90 can be made from 3-40 different sheets.

The first covering 26 may be designated so as to be above the second covering 90 during application of the apparatus 88. The first covering 26 may be black or dark in color so that it draws heat from the sun therein that may assist with the paint removal capabilities of the paint removal agent 22. The first covering 26 may thus be of a different color than the second covering 90, and in some embodiments may be of a darker color than the second covering 90. The second covering 90 may be clear in appearance so that one can view the paint removal agent 22 through the second covering 90. The second covering 90 may be thinner than the first covering 26. This may allow the second covering 90 to dissolve quickly upon contact with a fluid, and may allow the first covering 26 to remain intact even if a portion of the first covering 26 is dissolved by the fluid so that a barrier layer is still formed by the first covering 26. Additional thickness of the first covering 26 over the second covering 90 may also be as a result of a color layer that adds color to the first covering 26. The direction of thickness is the up and down direction in FIGS. 12 and 13 and is normal to the page in FIG. 11.

The first covering 26 and the second covering 92 need not be rectangular in other embodiments, and need not be the same size as one another. Further, in other arrangements, the storage covering 92 does not need to be included in the apparatus 88. Also, although described as having seals 94 and 96, the seals need not be present in other embodiments, or in some arrangements, the same seal can extend through and seal the storage pouch 92, first covering 26, and second covering 90 and separate sets of seals 94 and 96 are not necessary.

Previously in this application, discussion was made of the various materials that can make up the covering 26 so that the covering 26 is dissolvable upon engagement with water. For example, the covering 26 may be made of polyvinyl alcohol in one arrangement, may be MOWIFLEX TC® thermoplastic processable polyvinyl alcohol in another exemplary embodiment, may include polyvinyl acetate in yet another embodiment, or may include starch in yet another exemplary embodiment. The coverings 26 and/or 90 may be made so that they do not include paper or paper fibers therein. The coverings 26 and/or 90 may include only a film material and be completely plastic in some embodiments and can have varying degrees of flexibility. The first covering 26 and the second covering 90 of the apparatus 88, or any other embodiment herein discussed, can be configured in the same manner as previously discussed with respect to the materials making up covering 26 in other arrangements and a repeat of this information is not necessary. The first covering 26 and second covering 90 may be made of the same material as one another, or may be made of different materials or different amounts of materials in various arrangements.

The storage covering 92 can be made of a material different than the first covering 26 and second covering 90. The storage covering 92 may be made of polyethylene, polypropylene, other forms of poly pro, cellophane, polyvinyl chloride, or any type of plastic. The storage covering 92 may be made so that it does not dissolve in water. In yet other embodiments, the storage covering 92 may be a fabric. The storage covering 92 may be flexible and can be water impervious so that it functions to keep water out of its interior from contact with the coverings 26 and 90. The storage covering 92 allows the apparatus 88 to be rolled up or folded up for easy transport or storage.

Figure 14:
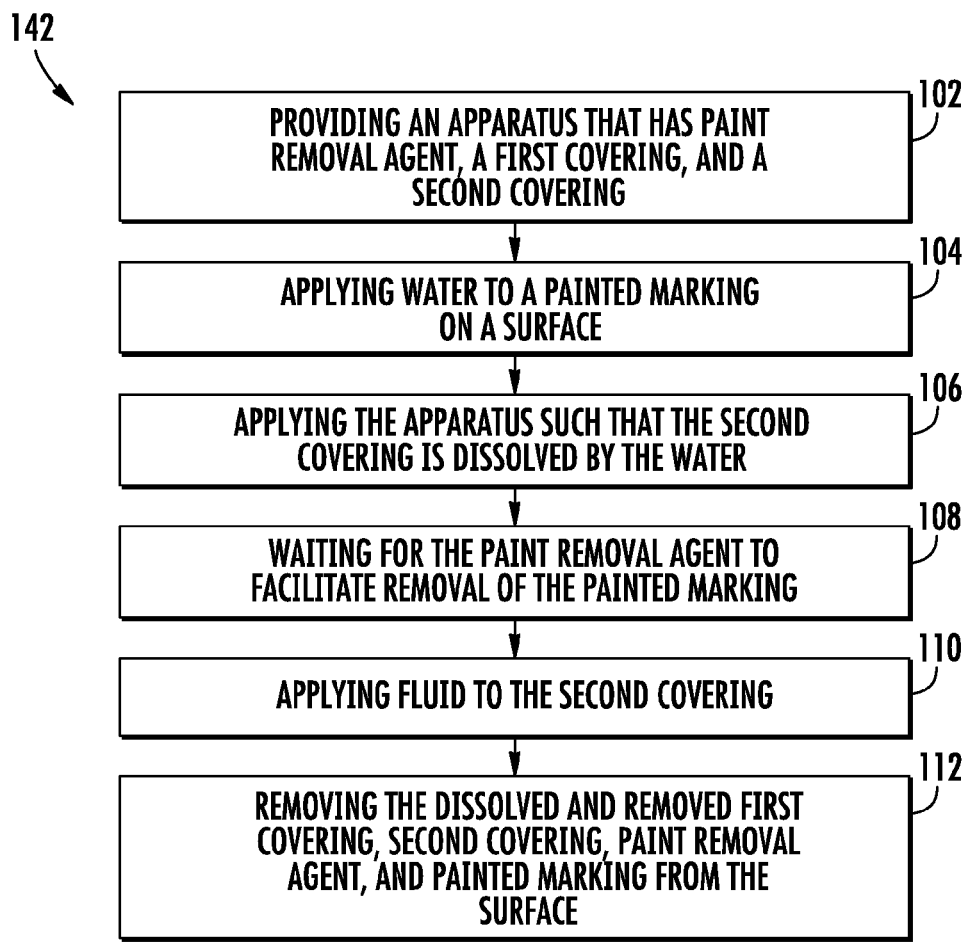
FIG. 14 is a flow chart of a method for removing painted markings in accordance with one exemplary embodiment.

With reference now to FIG. 14, a process 142 of removing painted markings 24 is disclosed in accordance with one exemplary embodiment. The process 142 may be used on painted markings 24 of any type that are on any type of surface 20. The first step 102 involves the provision of an apparatus, for example the apparatus 88 of FIGS. 11-13. The apparatus provided in step 102 may include a paint removal agent 22, a first covering 26, and a second covering 90. The paint removal agent 22 may be located between the coverings 26 and 90, and the first covering 26 and second covering 90 can be dissolvable in water. If a storage pouch 92 is included, the user may open the storage pouch 92 and remove the coverings 26 and 90 and the paint removal agent 22. The storage pouch 92 can then be discarded or subsequently reused.

The process 142 may then move to step 104 in which the user applies water to the painted marking 24 on the surface 20. This application may be through a hose, pressure washer, misting device, or any other type of device capable of applying water to a surface 20. The surface 20 may be horizontal and/or vertical and the water may be applied in any depth. Next, the process 142 moves to step 106 in which the apparatus 88 is applied to the water and painted marking 24 such that the second covering 90 engages the water. Since the second covering 90 is dissolvable by water, the water on the painted marking 24 functions to dissolve the second covering 90 to then cause the paint removal agent 22 to engage the painted marking 24.

Moving on to step 108, the paint removal agent 22 upon dissolution of the second covering 90 acts on the painted marking 24 to remove the painted marking 24 from the surface 20. The first covering 26 remains intact on top of the paint removal agent 22 to prevent or delay evaporation of the paint removal agent 22. The amount of water applied in step 104 and/or the presence of the paint removal agent 22 may function to prevent the first covering 26 from being wetted and breaking up via water contact. In other embodiments, the first covering 26 may in fact come into contact with the water such that some of the first covering 26 does dissolve. A bottom portion of the first covering 26 may dissolve such that a top portion still functions to cover the paint removal agent 22 and prevent it from evaporating. In other embodiments a hole may be dissolved through the first covering 26 such that it no longer functions to reduce evaporation to the exposed paint removal agent 22 underneath. In yet additional exemplary embodiments, no holes or breaks occur in the first covering 26 via dissolving by the applied water so that the entire first covering 26 functions as a barrier layer to prevent paint removal agent 22 evaporation. Any amount of time necessary can be spent waiting in step 108 to allow the paint removal agent 22 to work. For example, from 1 second to 10 minutes, from 10 minutes to 30 minutes, or up to 2 hours may be spent waiting in step 108 to allow the paint removal agent 22 time to break up the painted marking 24.

Once an amount of wait time has taken place, the process 142 may move from step 108 to step 110 in which fluid is applied to the first covering 26. This step can be optional in certain exemplary embodiments. The fluid may be water, and may function to completely or partially dissolve the first covering 26. The fluid applied in step 110 can be via the same mechanism used to apply water in step 104, or by a different application device or process. The fluid in step 110 may be water that is misted onto the first covering 26. In yet other embodiments, rain may fall onto the first covering 26 to accomplish, or help to accomplish, step 110. Wetting of the first covering 26 functions to dissolve the first covering 26 to expose the combined paint removal agent 22, painted marking 24, and second covering 90 underneath.

Step 112 may next be executed in which the first covering 26, paint removal agent 22, painted marking 24, and second covering 90 are removed from the surface 20. The various components 26, 22, 24 and 90 may or may not be dissolved at this point and may or may not be intermixed with one another. The removal process may be through any means such as a pressure washer, a hose, a scrapper blade, and/or rubber pellets applied through a non-abrasive blasting type application. The removal process can be the same as that disclosed with respect to other previously described embodiments and a repeat of this information is not necessary. As the paint removal agent 22 functioned to break up the painted marking 24, the various components can be scraped off, washed off, or otherwise removed from the surface 20. The pressure washing, if used, may also act to dissolve the first covering 26 so that the previous step 110 need not be used. Alternatively, if step 110 is used the pressure washing may not need to be as much or as intense, or may work more effectively if the first covering 26 is already fully or partially dissolved. With other removal processes such as vacuuming or non-abrasive blasting with rubber pellets, step 110 may be used to dissolve the first covering 26 so that subsequent removal of all the components is easier.

Figure 15:
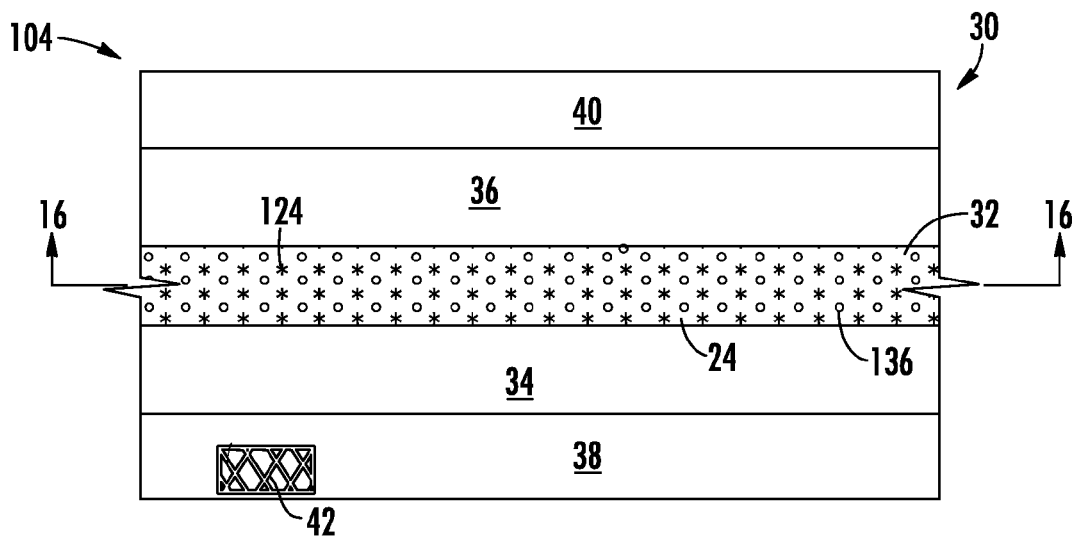
FIG. 15 is a top view of a road that has a painted marking that is a lane divider with a water layer applied.
Figure 16:
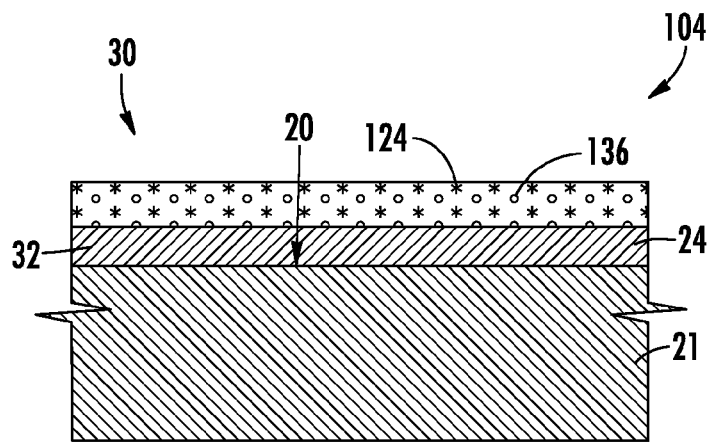
FIG. 16 is a cross-sectional view taken along line 16-16 of FIG. 15.

As mentioned, the apparatus 88 may be used in a process 142 of removing painted markings 24 from any type of surface 20 of any type of base 21. FIGS. 15 and 16 show the process in connection with a painted marking 24 that is a lane divider 32 of a road 30. However, it is to be understood that this is for purposes of discussion only and that the painted marking 24 can be any other type of marking on the road 30 in other arrangements, and that the surface 20 and base 21 need not be a road 30 but could be for example an interior or exterior wall of a home, a rock wall, a retaining wall, or a vehicle in other exemplary embodiments. FIGS. 15 and 16 show step 104 of one embodiment of the process 142 in which the water layer 136 may be applied to the painted marking 24. The water layer 136 may be of any depth such as from 0.1-1 millimeter, 1-2 millimeters, 2-3 millimeters, or up to 10 millimeters. The water layer 136 need not be completely continuous over the entire painted marking 24, but there may be portions of the painted marking 24 that are uncovered by the water layer 136 in some arrangements. The water making up the water layer 136 can be applied via any application source such as a hose, pressure washer, or sprayer. In some embodiments, rain water may have fallen onto the painted marking 24 thus creating the water layer 136, or partially creating it while additional water is applied by the user. The water may be misted onto the painted marking 24 to form the water layer 136 in some embodiments. Any type of machine or process can be used to apply the water layer 136 to the painted marking 24.

In some embodiments, a gel additive 124 can be included in the water layer 136 that is used to help hold the water layer 136 in proper position on the painted marking 24. The gel additive 124 functions to make the water more viscous so that the water layer 136 does not flow off of the painted marking 24 at all or as quickly. The gel additive 124 may also work to reduce evaporation of the water of the water layer 136 to further ensure it is present for subsequent steps in the process. As such, in some embodiments the gel additive 124 can function to help both keep the water in place and to reduce evaporation of the water while on the painted marking 24.

The gel additive 124 can be made of a variety of materials for increasing the viscosity and/or reducing the evaporation rate of the water into which it is contained. In some arrangements, the gel additive 124 may be polyglycol and can be polyethylene glycol, polypropylene glycol, or methoxypolyethylene glycol. In other embodiments, the gel additive 124 can be starch or polyacrylamide. Also, the gel additive 124 can include any combination of the above materials or other materials.

The next step 106 in the process 142 is illustrated with reference to FIGS. 17 and 18 in which the apparatus 88 is placed on top of the water layer 136 so that the second covering 90 engages the water layer 136. If the first covering 26 and second covering 90 are marked or colored differently, the user may be more quickly able to determine which side should engage the water layer 136. However, in instances where the first covering 26 and second covering 90 are identical to one another, either side may be placed onto the water layer 136 and no marking indicia is needed. The apparatus 88 may cover the entire water layer 136 and painted marking 24 or only portions of these components. The apparatus 88 may be rectangular in shape and elongated for use with painted markings 24 such as lane dividers 32 that are themselves narrow and elongated in shape. The apparatus 88 can be of any length and may be discontinuous such that a plurality of apparatuses 88 are used on a stretch of roadway. The second covering 90 shown in FIG. 18 is just before being dissolved by the water layer 136 and is fully intact.

Figure 17:
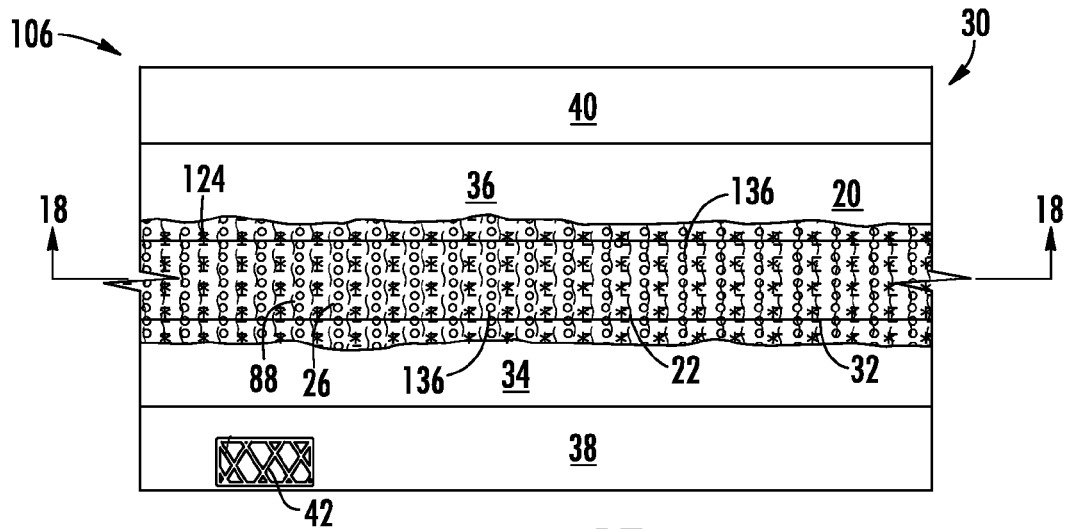
FIG. 17 is a top view of the road of FIG. 15 with an apparatus applied to the water layer.
Figure 18:
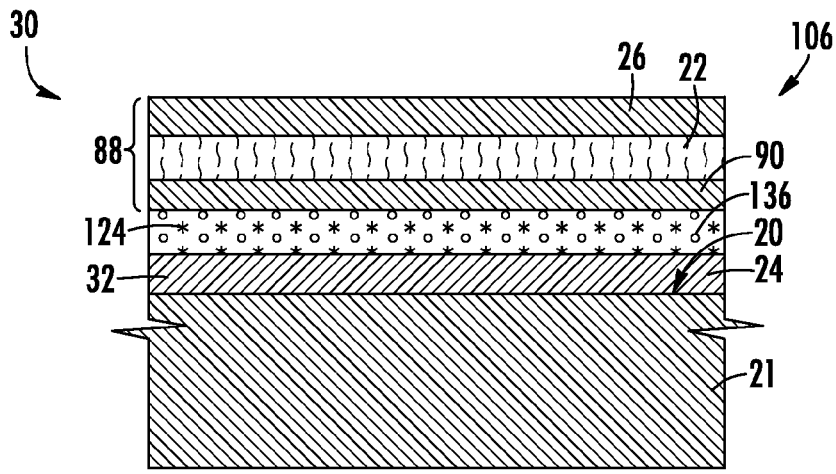
FIG. 18 is a cross-sectional view taken along line 18-18 of FIG. 17.
Figure 19:
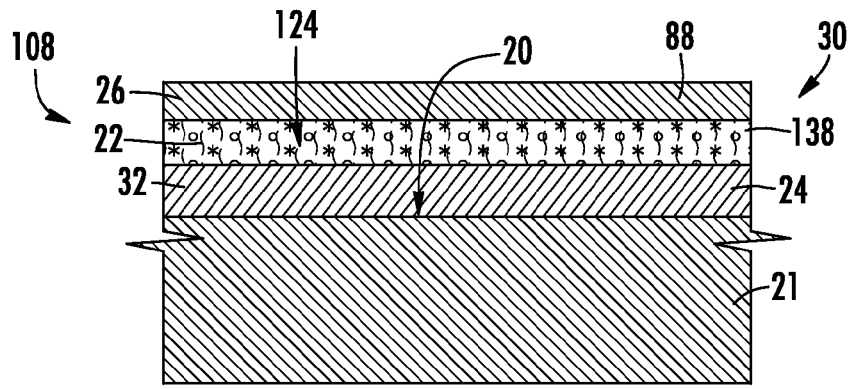
FIG. 19 is a cross-sectional view of an apparatus with a dissolved second covering in accordance with another exemplary embodiment.

FIG. 19 shows the second covering 90 dissolved by the water layer 136 and may take place subsequent to the view in FIGS. 17 and 18 right before the second covering 90 is dissolved. Dissolving of the second covering 90 results in a combined layer 138 of the paint removal agent 22, first covering 26, and water layer 136. The combined layer 138 rests on top of the painted marking 24 and will begin to dissolve or otherwise remove the painted marking 24 from the surface 20 due to the presence of the paint removal agent 22. The first covering 26 remains on top of the combined layer 138 to prevent evaporation of the paint removal agent 22 and to also help prevent flowing or other movement of the combined layer 138 off of the painted marking 24. Although the painted marking 24 is shown intact, it is to be understood that once the second covering 90 is dissolved and the paint removal agent 22 engages the painted marking 24, the painted marking 24 will begin to be removed or dissolved as well.

Figure 20:
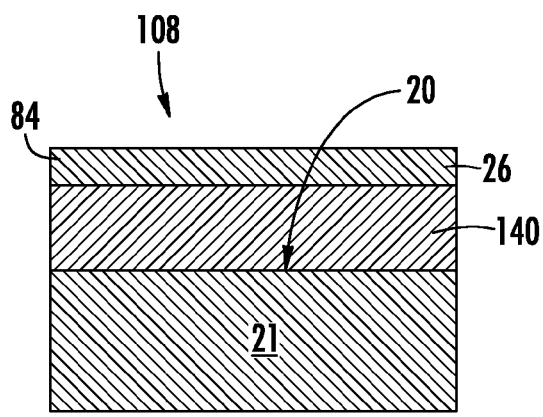
FIG. 20 is a cross-sectional view of an apparatus with a dissolved second covering and a partially dissolved first covering in accordance with another exemplary embodiment.

FIG. 20 shows an alternate exemplary embodiment of the process 142 in which a portion of the first covering 26 is dissolved by the water layer 136. Here, application of the apparatus 88 to the water layer 136 causes dissolving of the second covering 90 along with the dissolving of some of the first covering 26. The water layer 136 may seep through the paint removal agent 22 and engage the first covering 26 to partially dissolve the first covering 26. The paint removal agent 22 begins to remove the painted marking 24 so that a combined layer 140 is produced that includes the painted marking 24, the paint removal agent 22, the water layer 136, the dissolved second covering 90, and a dissolved portion of the first covering layer 26. A remaining covering portion 84 of the first covering 26 is left on top of the combined layer 140 to prevent evaporation of the paint removal agent 22 while it removes the painted marking 24. FIG. 20 discloses an arrangement in which the first covering 26 comes into contact with fluid and partially dissolves. It is to be understood that in other embodiments, the first covering 26 remains dry and no portion of the first covering dissolves before step 110 or step 112.

Figure 21:
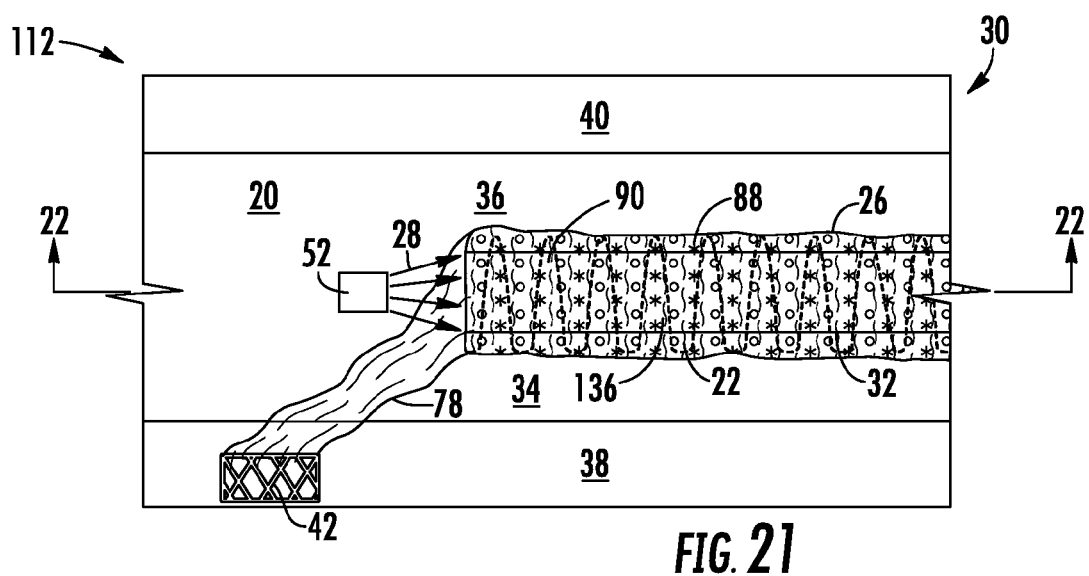
FIG. 21 is a top view of the road of FIG. 17 during a removal step of the apparatus, water layer, and painted marking.
Figure 22:
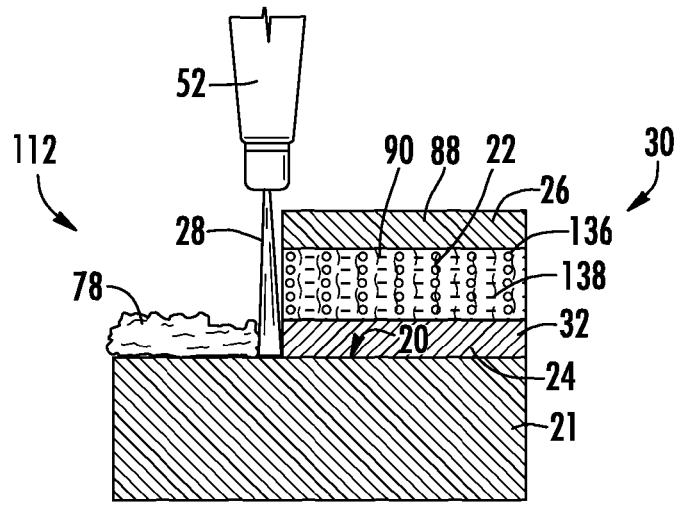
FIG. 22 is a cross-sectional view taken along line 22-22 of FIG. 21.

FIGS. 21 and 22 illustrate a removal step 112 of the process 142 in which a pressure washer 52 is used to remove the various components from the surface 20. The apparatus 88 is applied such that the second covering 90 has dissolved to result in the combined layer 138. Although the painted marking 24 is not shown combined with the paint removal agent 24 or other components but is instead its own layer, it is to be understood that in the embodiment in FIGS. 21 and 22 that the paint removal agent 22 has acted on the painted marking 24 to begin the process of removal of the painted marking 24 from surface 20. In other arrangements, the combined layer 140 of FIG. 20 can be illustrated in FIGS. 21 and 22 so that the painted marking 24 is shown combined with the paint removal agent 22 into a single layer.

Application of the fluid 28, that may be water, from the pressure washer 52 causes the first covering 26 to be dissolved since it may be dissolvable by a fluid. The water and pressure from the fluid 28 may also function to break up the combined layer 138 and the painted marking 24 to blast these components off of the surface 70. The washed off components 78 can flow off of the road 30 via its natural draining channels into the drain 42. Alternatively or additionally, the washed off components 78 can be collected by a user and disposed of via proper channels. A step 110 may have been previously conducted so that a fluid was first applied to first covering 26 to dissolve it either completely or partially before the pressure washing fluid 28 is applied. If the first covering 26 was black or dark in color, this colored portion may also be dissolvable in water. Force from the pressure washing fluid 28 may act in concert with the removal functionality of the paint removal agent 22 to wash the painted marking 24 off of the surface 20. If the first covering 26 is present, the fluid 28 may first engage the first covering 26 before the fluid 28 engages the combined layer 138 or the painted marking 24.

Although described as involving a pressure washer 52, the removal step 112 can be accomplished via other mechanisms. For instance, the dissolved coverings 26 and 90, water layer 136, paint removal agent 22, and painted marking 24 can be removed by being vacuumed up, rinsed off with water, mechanically collected, scraped off with a scrapper blade or other scraping device, or removed via blasting. Blasting may be either abrasive blasting or non-abrasive blasting. In abrasive blasting, sand or other abrasive materials are projected at high velocity onto the object for removal. In non-abrasive blasting, non-abrasive objects, for example rubber pellets, are projected at the components for removal. The rubber pellets may be white in some instances, black in color in other instances, or may be granulated rubber. The use of blasting may allow for the components to be removed from the surface in the removal step 112 without the use of water thus making clean up easier because painting markings 24 that could potentially include lead can be cleaned up without being in water so that toxic waste dumping expenses are reduced. Although blasting has been described in accordance with step 112, it can be used with any of the disclosed embodiments herein to effect removal, and need not be used only in association with the apparatus 88.

In yet other exemplary embodiments, the removal step 112 is accomplished by not doing anything proactively to the components but simply allowing rain or other elements to wash or otherwise blow the components off of the surface 20.

Figure 23:
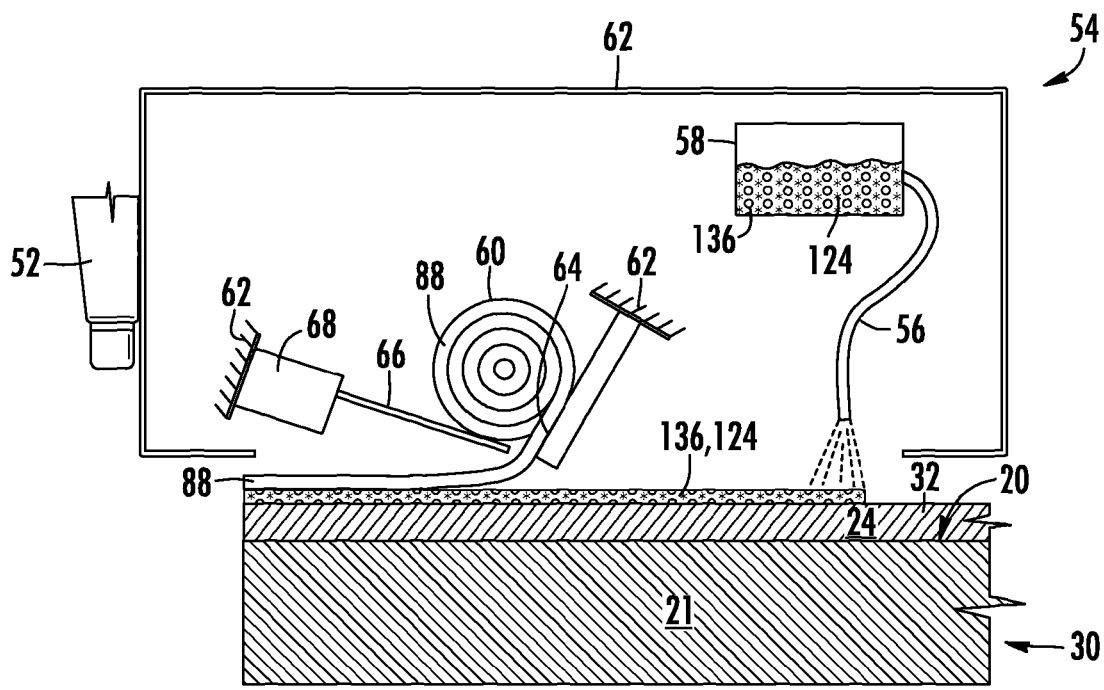
FIG. 23 is a schematic side view of a device for applying a water layer and an apparatus for the removal of painted markings in accordance with one exemplary embodiment.

An apparatus 54 that can be used in performing certain steps of the process 142 of removing the painted markings 24 is shown in FIG. 23. The apparatus 54 can have wheels and may be capable of being moved along the road 30. The apparatus 54 includes a frame 62 that carries a tank 58 that holds water 136. A gel additive 124 can be present in the water 136 in some arrangements. In other arrangements, a gel additive 124 is not used, or is present but provided separate from the water 136 in the tank 58. An applicator 56 extends from the tank 58 and the water 136 is dispensed by the applicator 56 onto the painted marking 24 to form the water layer 136. The gel additive 124 may be included in the water 136 applied to form the water layer 136, or the gel additive 124 may be applied separately either before or after the water is applied.

The apparatus 54 includes a roll 60 of the apparatus 88. A cutting surface 64 is mounted to frame 62 along with a pneumatic actuator 68 and cutting blade 66 as previously discussed. The roll 60 of apparatus 88 can be unwound on top of the water layer 136 so that the second covering 90 comes into contact with the water layer 136. Once a desired amount of apparatus 88 has been unwound, the cutting blade 66 can be used to cut the apparatus 88. The roll 60 can be arranged so that the second covering 90 faces downward and against the water layer 136 and so the first covering 26 faces upwards with the paint removal agent 22 between the first covering 26 and the water layer 136. In other arrangements, the apparatus 88 need not be provided on a roll 60, or may be torn or cut through a different arrangement once the desired length has been dispensed. A pressure washer 52 may be mounted to the frame 62 of the apparatus 54 rearward of the roll 60, and can be used for the removal step once the paint removal agent 22 contained in the apparatus 88 has had enough time to function to act on the painted marking 24.

Figure 24:
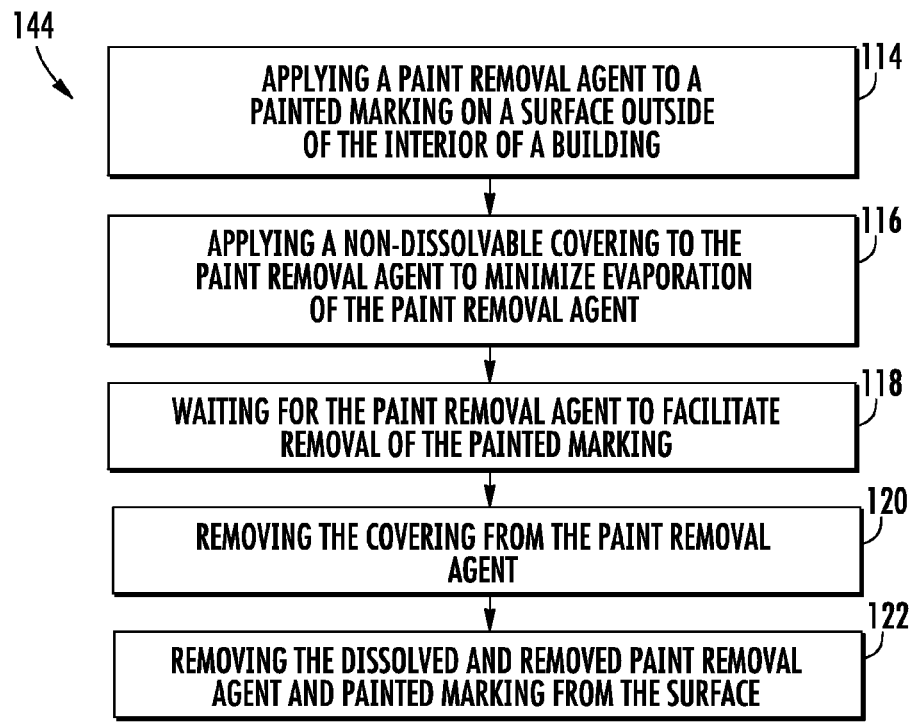
FIG. 24 is a flow chart of a method for removing painted markings with the use of a non-water dissolvable covering in accordance with one exemplary embodiment.

A process 144 of removing painted markings 24 is disclosed in accordance with another exemplary embodiment in FIG. 24. In step 114, a paint removal agent 22 is applied to a painted marking 24 that is desired to be removed. The painted marking 24 is on a surface 20 that is a surface exterior of a building 134. In this regard, the outside surface 134 is not located inside of a building such as a residence or a commercial building. The surface outside of the building 134 can be a road, a billboard, a railroad car, a rock wall, the exterior wall of a residence, the exterior wall of a commercial building, a sidewalk, or a vehicle. The surface outside of the building 134 can be any surface that is exposed to the elements and that is not located in an interior space of a building.

Figure 25:
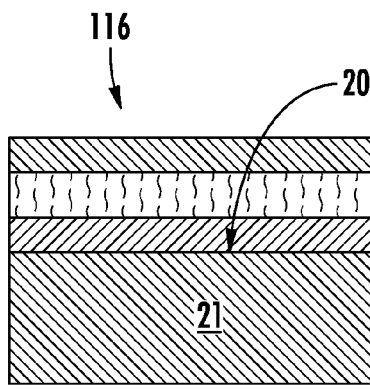
FIG. 25 is a cross-sectional view of a covering applied to a paint removal agent during a step of the method of FIG. 24.

The process 144 may then move to step 116 in which a non-dissolvable covering 26 is applied over the paint removal agent 22 to minimize or prevent evaporation of the paint removal agent 22. The non-dissolvable covering 26 may be plastic that does not dissolve upon contact with water. The non-dissolvable covering 26 may be taped down or held into place so that wind or other forces do not push the non-dissolvable covering 26 off of the paint removal agent 22. Alternatively, the non-dissolvable covering 26 may simply be placed onto the paint removal agent 22 and held thereon through gravity or a tacky quality of the paint removal agent 22. FIG. 25 illustrates one exemplary embodiment of step 116 in which the painted marking 24 outside of the building 134 has a paint removal agent 22 applied and in which a non-dissolvable covering 26 is applied to the paint removal agent 22. The non-dissolvable covering 26 may be applied to the paint removal agent 22 before these two components are placed onto the painted marking 24, or the non-dissolvable covering 26 may be applied to the paint removal agent 22 after the paint removal agent 22 is located on the painted marking 24. A covering made from material, for instance, the same as that disclosed making up the storage covering 92 can first be located on the apparatus in FIG. 25 against the paint removal agent 22 for ease of storage and transport purposes to the application site. This covering may be non-dissolvable in water, and can first be removed to allow subsequent application of the paint removal agent 22 and covering 26 to the painted marking 24.

The next step in the process 144 may be step 118 in which the user will wait for some amount of time for the paint removal agent 22 to facilitate removal of the painted marking 24. Once some amount of time has passed, the user may remove the non-dissolvable covering 26 from the paint removal agent 22 in step 120. The non-dissolvable covering 26 can be simply picked up and placed to the side. In some arrangements, none of the painted marking 24 is present on the non-dissolvable covering 26 when the non-dissolvable covering 26 is removed but instead still remains completely on the surface 20. In other arrangements, some of the painted marking 24 is picked up by the non-dissolvable covering 26 when it is removed. The non-dissolvable covering 26 may have some of the paint removal agent 22 on it when it is pulled up and may be cleaned or otherwise disposed of through proper disposal channels.

Figure 26:
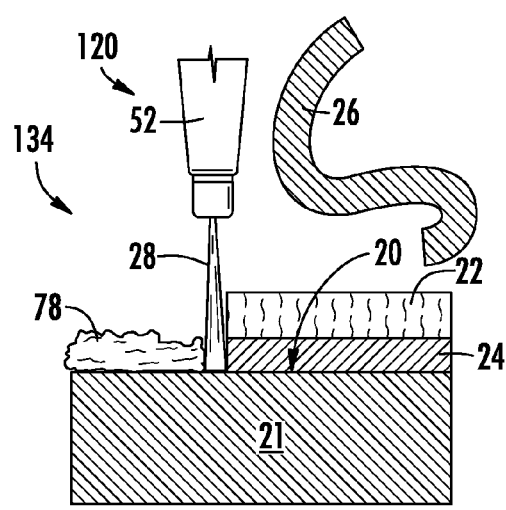
FIG. 26 is a cross-sectional view of the arrangement of FIG. 25 with the covering removed and with a pressure washer effecting removal of the paint removal agent and painted marking.

A removing step 122 can then be conducted in which the dissolved and removed painted marking 24 and paint removal agent 22 are removed from the surface 20. One exemplary embodiment of the removing step 122 is illustrated in FIG. 26. The removing step 122 can be conducted by a pressure washer 52, a hose, abrasive blasting with rubber pellets, a scrapper blade, or any other type of mechanical collection.

The resulting removed components 78 can be collected or allowed to drain away via normal drainage channels for the outside surface 134 that is being cleaned. In FIG. 26, the non-dissolvable covering 26 has been removed from the paint removal agent 22 before the pressure washer 52 applies fluid 28 to the paint removal agent 22. Removal of the non-dissolvable covering 26 may be made such that none of the painted marking 24 is located on the non-dissolvable covering 26. However, some of the paint removal agent 22 may be located on the non-dissolvable covering 26 when the non-dissolvable covering 26 is pulled off. The fluid 28 does not contact the non-dissolvable covering 26 but instead engages the paint removal agent 22 first and then the painted marking 24 to function to drive these components off of the surface 20 in the form of the washed off components 78.

Figure 27:
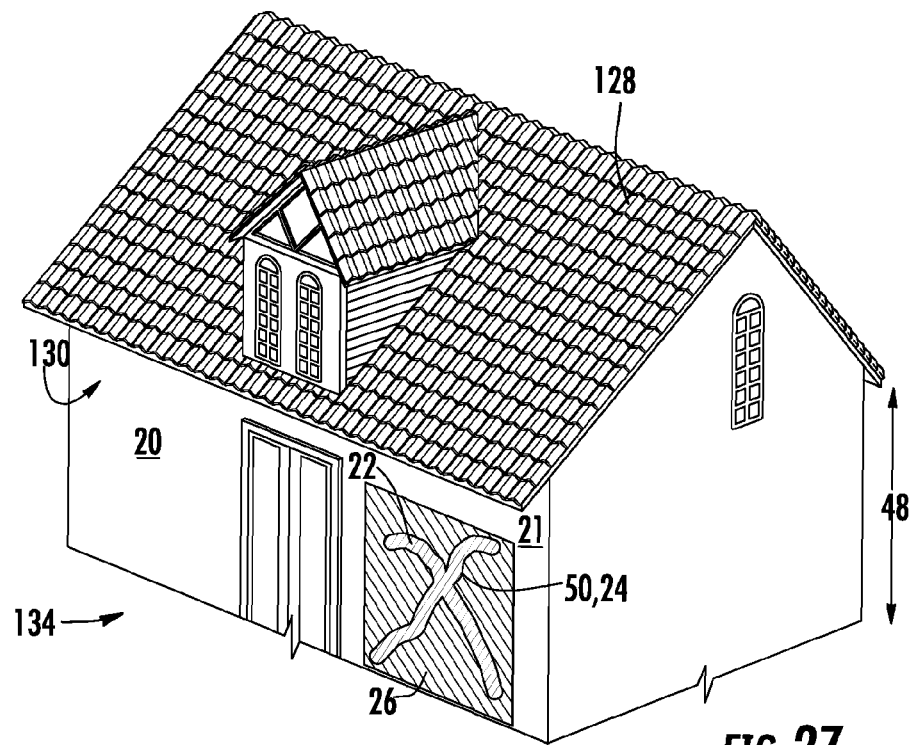
FIG. 27 is a perspective view of a painted marking applied to an exterior wall of a building.
Figure 28:
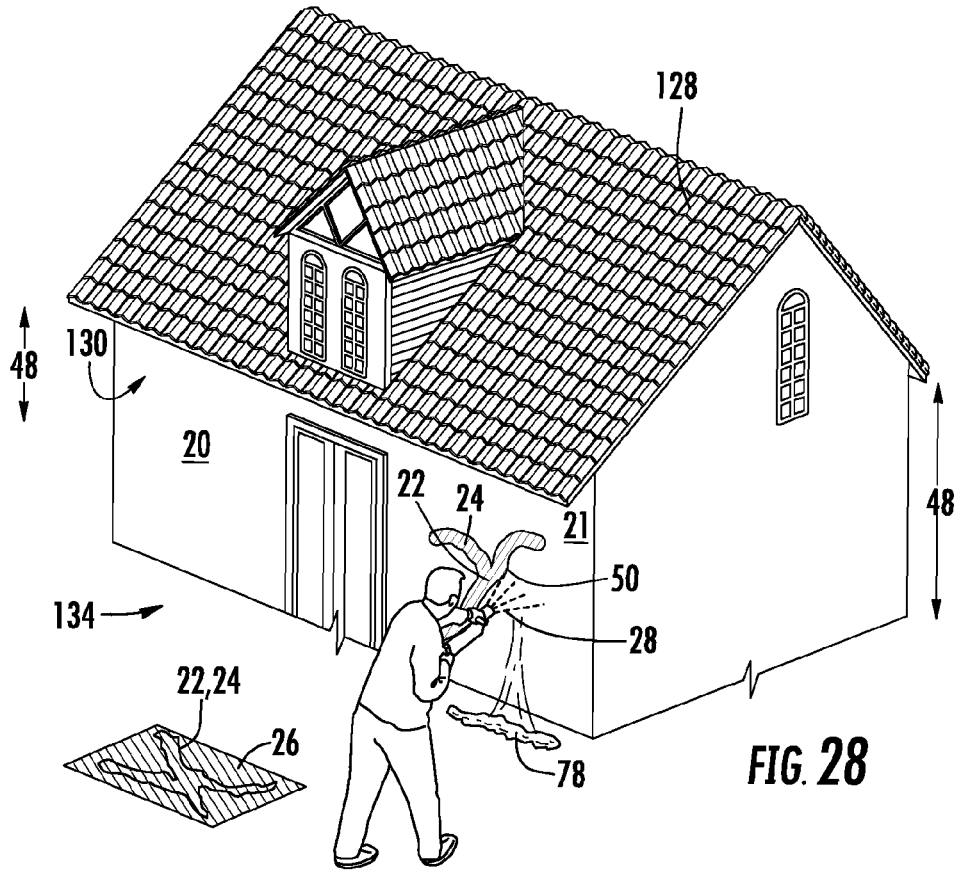
FIG. 28 is a perspective view of the building of FIG. 27 showing removal of the painted marking.

The process 144 is used to remove painted markings 24 from an exterior wall 130 of a building 128 as shown in FIG. 27. The exterior wall 130 is in an exterior 134 of the building because the exterior wall 130 is not located inside of the building 128 and is exposed to the environment. The exterior wall 130 has a vertical surface 20. The paint removal agent 22 is applied to the painted marking 24 that is on the vertical surface 20 and the covering 26 then covers the paint removal agent 22 to prevent or minimize evaporation. The covering 26 is not dissolvable in water such that if water contacts the covering 26 the covering 26 does not dissolve. Tape or other fasteners can be used to attach the covering 26 to the vertical surface 20. Additionally or alternatively, the paint removal agent 22 can have tackiness sufficient to cause the covering 26 to stick thereon.

After the paint removal agent 22 functions to break up the painted marking 24, the covering 26 is removed. The user may then perform step 122 in which a fluid 28 is applied to the paint removal agent 22 and painted marking 24 to wash them off of the vertical surface 20. Some amount of the paint removal agent 22 and the painted marking 24 may be stuck onto the covering 26 when the covering 26 is removed and may need to be disposed or washed off if the covering is to be reused.

Figure 29:
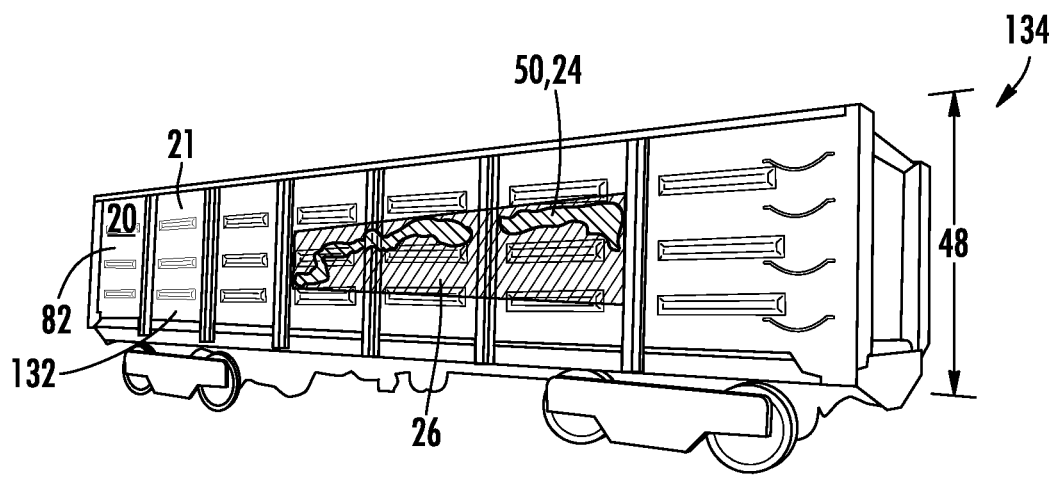
FIG. 29 is a perspective view of a railroad car with a painted marking applied thereon.
Figure 30:
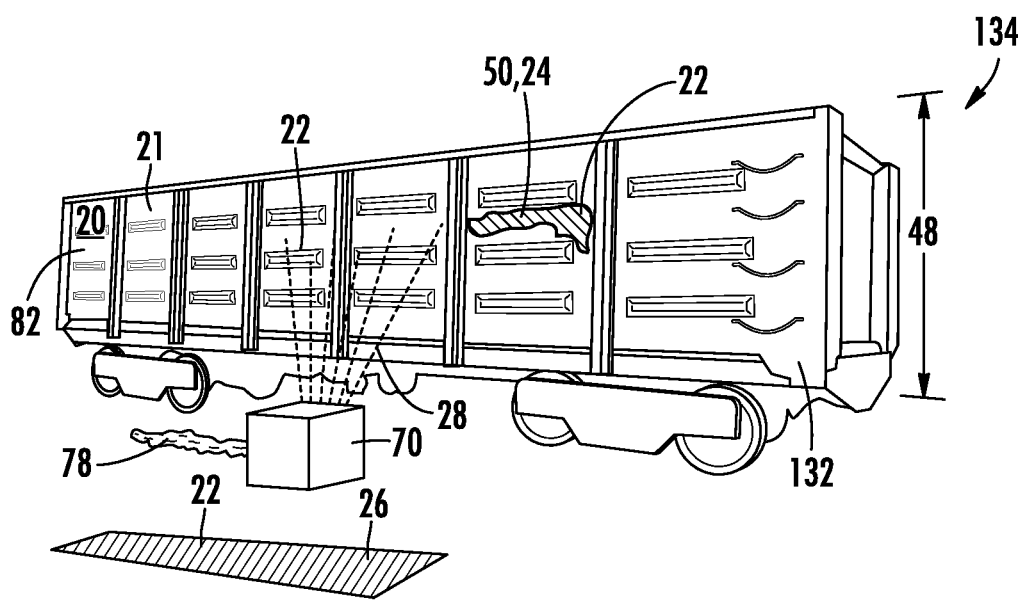
FIG. 30 is a perspective view of the railroad car of FIG. 29 showing removal of the painted marking.

Another exemplary embodiment of the use of process 144 is shown in FIGS. 29 and 30 in which an outside of a building 134 is where the process 144 is performed. Graffiti 50 in the form of painted markings 24 are on a vertical wall 20 of a railroad car 132. The railroad car 132 is located outside of a building 134 because the railroad car 132 is not inside of a building or other structure and is exposed to the elements. The painted marking 24 has paint removal agent 22 applied thereto, and the covering 26 is located on top of both the paint removal agent 22 and the painted marking 24 to prevent or minimize evaporation of the paint removal agent 22. After a sufficient time has passed to allow the paint removal agent 22 to work, the covering 26 is removed as shown in FIG. 30 and a portion of the paint removal agent 22 is located on the removed covering 26. In this arrangement, no portion of the painted marking 24 is removed upon removal of the covering 26 and no portion of the painted marking 24 remains on the covering 26 once the covering is removed. Once the covering 26 is removed from the vertical surface 20, the apparatus 70 may be used to remove the painted marking 24 and paint removal agent 22 from the vertical surface 20. However, other means of removing the painted marking 24 and the paint removal agent 22 are possible. The washed off components 78 can be collected and disposed of, or may be non-collected as desired.

Although the process 144 has been illustrated as being used on an exterior wall 130 of a building 128, and on a vertical surface 20 of a railroad car 132, it is to be understood that these surfaces for application are only exemplary and that other are possible. These surfaces may be horizontal, vertical, or inclined in orientation and need only be outside of a building 134.

Strippers used in the removal of paint from surfaces 20 such as roads 30, exterior walls 130, and railroad cars 132 may include methylene chloride or caustic materials that damage the surface 20 to which they are applied. For example, an asphalt road 30 is damaged upon the application of these types of strippers as the methylene chloride or caustic materials break up the bonds of petroleum in the asphalt to cause pitting, discoloration, or other damage on the surface 20. Applicant has unexpectedly discovered that the application of the paint removal agents 22 identified herein onto surfaces such as asphalt roads 30 do not mix or otherwise react with the asphalt when applied and do not damage the asphalt or leave damaged discolorations upon removal. Generally speaking, the paint removal agents 22 identified and discussed herein may be alcohol based, water soluble, and biodegradable and were previously described and identified and a repeat of this information is not necessary. Further, all of or some of the other components such as the first covering 26, second covering 90, and gel additives 124 of the variously described processes may likewise be biodegradable.

Figure 31:
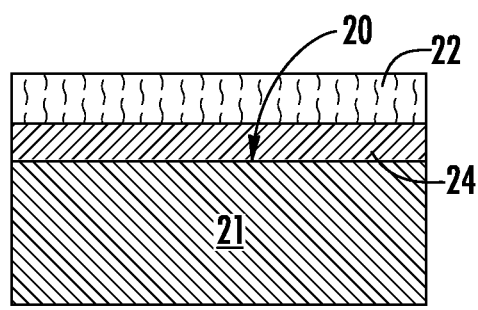
FIG. 31 is a cross-sectional view of an asphalt surface with paint removal agent and a painted marking in accordance with another exemplary embodiment.
Figure 32:
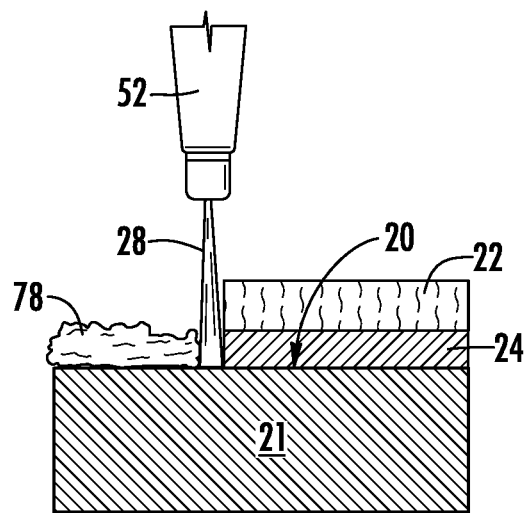
FIG. 32 is a cross-sectional view of the asphalt surface of FIG. 31 with a pressure washer being used to remove the painted marking and paint removal agent.

In accordance with certain exemplary embodiments, the base 21 along with surface 20 are asphalt. FIGS. 31 and 32 show one exemplary embodiment in which the surface 20 and base 21 are made of asphalt and in which a paint removal agent 22 has been applied. The paint removal agent 22 may be any of the previously identified paint removal agents 22 that do not damage the surface 20 that is asphalt upon application to the painted marking 24. A covering 26 need not be used in the disclosed embodiment, although others exist in which a covering 26 is in fact used. The paint removal agent 22 may function to break up the painted marking 24 and can engage the asphalt surface 20 before it is removed. The separation of the paint removal agent 22 from the surface 20 shown in FIGS. 31 and 32 are for illustrative purposes only and it is to be understood that when the paint removal agent 22 interacts with the painted marking 24 it also engages the surface 20. Since the particular paint removal agent 22 does not damage asphalt it can remain on the surface 20 and be washed away once a sufficient dwell time of painted marking 24 removal has been reached. Although a pressure washer 52 is shown for removal purposes, the components can be removed or cleaned up using any of the variously described techniques herein.

Asphalt when used in roads is sometimes referred to as asphalt concrete. As such, as used herein the term "asphalt" is broad enough to cover and include asphalt concrete. Asphalt concrete is made of aggregates and asphalt. The asphalt is made of a performance graded (PG) binder or some variation of a PG binder and makes up 5% to 10% by weight of the asphalt concrete. As such, the asphalt concrete may be made of aggregates and PG binder. Aggregates are classified into either fine aggregates or coarse aggregates and make up from 90% to 95% by weight of the asphalt concrete.

PG binder is a constituent of petroleum and can be formed through a refining process. Almost all PG binders used in the United States are produced from oil refineries and are sometimes referred to as petroleum asphalt. This material when used for road applications is sometimes referred to as paving asphalt or asphalt cement to distinguish its use from other non-paving applications. PG binders are made entirely or almost entirely of bitumen, which is soluble in carbon disulfide. The remaining portion of the PG binders may be made of impurities or may be made of other materials.

The aggregates in the asphalt concrete may make up by volume from 75% to 85% of the volume of the asphalt concrete. Aggregates provide load supporting capacity for the road surface. The aggregate may be any inert material capable of being mixed in graduated particles or fragments. Examples of materials that can be aggregates include sand, gravel, stone, and slag. The aggregates can be natural aggregates such as stone or sand, processed aggregates such as stone or sand that is crushed and then subsequently filtered, or synthetic aggregates which are formed through a chemical change of a material and could be in some instances blast furnace slag.

Although exemplary embodiments have been described in which the paint removal agent 22 does not damage asphalt or other surfaces 20 to which they are applied, it is to be understood that the present application includes other arrangements in which the paint removal agent 22 does in fact damage or discolor the asphalt or other surfaces 20 to which they are applied. As such, the paint removal agent 22 may in fact include methylene chloride or caustic materials in other arrangements.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. An apparatus for use in removing painted marking(s), comprising:
   a first covering that is dissolvable by water;
   a second covering that is dissolvable by water; and
   a paint removal agent that is located between the first covering and the second covering when the first covering and the second covering are not dissolved, wherein the paint removal agent has a consistency selected from the group consisting of a paste, a gel, and a liquid;
   wherein water engages the second covering and dissolves the second covering such that the first covering is intact on top of the paint removal agent and the painted marking(s) and functions as a vapor barrier, and such that the first covering is not completely dissolved by the water, and such that the paint removal agent engages the painted marking(s), wherein the first covering is of a darker color than the second covering such that the first covering draws more heat therein than the second covering to enhance paint removal capabilities of the paint removal agent.

2. The apparatus as set forth in claim 1, wherein the first covering is dissolvable plastic that is at least partially made of polyvinyl alcohol; and
   wherein the second covering is dissolvable plastic that is at least partially made of polyvinyl alcohol.

3. The apparatus as set forth in claim 1, further comprising a storage covering that encloses the first covering, the second covering, and the paint removal agent, wherein the storage covering is used for storage and transportation of the apparatus such that when used in the removal of the painted marking(s) the first covering, the second covering, and the paint removal agent are removed from the storage covering, wherein the storage covering is not dissolvable by water.

4. The apparatus as set forth in claim 1, wherein the first covering and the second covering are integrally attached to one another so as to be a single sheet.

5. The apparatus as set forth in claim 1, wherein a portion of the first covering engages a portion of the second covering, wherein a seal is present at the engagement between the portion of the first covering and the portion of the second covering in order to retain the portion of the first covering to the portion of the second covering, wherein the first covering is of a different color that is darker than the second covering.

6. The apparatus as set forth in claim 5, wherein the first covering is black, and wherein the first covering has a thickness that is greater than a thickness of the second covering, wherein the second covering has a degree of transparency great enough to allow the paint removal agent to be viewed through the second covering.

7. The apparatus as set forth in claim 1, wherein the first covering and the second covering are at least partially made of a material selected from the group consisting of starch and polyvinyl alcohol; and
   wherein the paint removal agent is at least partially made of a material selected from the group consisting of dibasic ester, N-Methyl-2-pyrrolidone, and formic acid.

8. The apparatus as set forth in claim 1, wherein the first covering is partially dissolved by the water.

9. The apparatus as set forth in claim 1, wherein no portion of the first covering is dissolved by the water.

* * * * *